(12) United States Patent
Hollinger

(10) Patent No.: US 11,235,906 B2
(45) Date of Patent: *Feb. 1, 2022

(54) STACKABLE AND NESTABLE COOKWARE HAVING A STABLE CONFIGURATION

(71) Applicant: E. MISHAN & SONS, INC., New York, NY (US)

(72) Inventor: Fred Hollinger, Monroe Township, NJ (US)

(73) Assignee: E. MISHAN & SONS, INC., New York, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/790,144

(22) Filed: Feb. 13, 2020

(65) Prior Publication Data

US 2020/0180815 A1  Jun. 11, 2020

Related U.S. Application Data

(63) Continuation-in-part of application No. 16/245,814, filed on Jan. 11, 2019, now Pat. No. 11,039,706.

(Continued)

(51) Int. Cl.
*B65D 21/032* (2006.01)
*B65D 21/02* (2006.01)

(Continued)

(52) U.S. Cl.
CPC .......... *B65D 21/0213* (2013.01); *A47J 27/10* (2013.01); *A47J 27/12* (2013.01); *A47J 37/10* (2013.01);

(Continued)

(58) Field of Classification Search
CPC .......... A47J 36/34; A47J 45/061; A47J 45/06; A47J 27/12; A47J 27/002; B65D 21/0233; B65D 21/0213

(Continued)

(56) References Cited

U.S. PATENT DOCUMENTS

| 1,268,017 A | 5/1918 | Knight |
| 2,037,807 A | 4/1936 | Lockwood |

(Continued)

FOREIGN PATENT DOCUMENTS

| AU | 503645 | 1/1978 |
| CA | 1255240 | 6/1989 |

(Continued)

OTHER PUBLICATIONS

Screen capture of website at http://https://gothamstackmaster.com/, retrieved Feb. 4, 2020.

(Continued)

*Primary Examiner* — Stephen J Castellano
(74) *Attorney, Agent, or Firm* — Notaro, Michalos & Zaccaria P.C.

(57) ABSTRACT

A set of nestable and stackable cookware, for example, a set of pots and pans, is maintained in a stable configuration by stops attached to the outer walls of the cookware. Each stacked and nested item of cookware is supported on the rim of the lower item by two stops attached to its outer wall, on opposite sides of the item, so that the wall and base of the item is not contacting the lower item. Either or both of the stops include a handle extending outwardly from the stop.

11 Claims, 43 Drawing Sheets

Related U.S. Application Data

(60) Provisional application No. 62/782,114, filed on Dec. 19, 2018.

(51) Int. Cl.
*A47J 37/10* (2006.01)
*A47J 27/10* (2006.01)
*A47J 27/12* (2006.01)
*A47J 36/34* (2006.01)
*A47J 45/06* (2006.01)
*A47J 27/00* (2006.01)

(52) U.S. Cl.
CPC ......... *B65D 21/0233* (2013.01); *A47J 27/002* (2013.01); *A47J 36/34* (2013.01); *A47J 45/06* (2013.01); *A47J 45/061* (2013.01)

(58) Field of Classification Search
USPC ........................................................ 220/756
See application file for complete search history.

(56) References Cited

U.S. PATENT DOCUMENTS

| | | |
|---|---|---|
| 2,058,807 A | 10/1936 | Lockwood |
| 2,116,487 A | 5/1938 | Jackson |
| 2,116,489 A | 5/1938 | Jackson |
| 2,199,687 A | 5/1940 | Blankenship |
| 2,222,584 A | 11/1940 | Oltman |
| 2,624,487 A | 1/1953 | Fry |
| 3,641,920 A | 2/1972 | Kraft et al. |
| 4,204,609 A | 5/1980 | Kuhn |
| 4,714,012 A | 12/1987 | Hernandez |
| 5,253,758 A | 10/1993 | Bissell, II |
| D349,420 S | 8/1994 | Hasuike |
| D358,062 S | 5/1995 | Hasuike |
| 5,878,904 A * | 3/1999 | Schweigert ............. B65F 1/085 220/23.88 |
| 6,237,775 B1 | 5/2001 | Hatch et al. |
| 7,347,327 B2 | 3/2008 | Lobman et al. |
| D639,108 S | 7/2011 | Molayem |
| D641,201 S | 7/2011 | Molayem |
| 8,272,531 B2 | 9/2012 | Cuillery et al. |
| 8,413,840 B2 | 4/2013 | Metaxatos et al. |
| 8,978,547 B2 | 3/2015 | Salvino |
| 8,991,640 B2 | 3/2015 | Stith |
| 9,139,926 B2 | 9/2015 | Musil et al. |
| D822,424 S | 7/2018 | Ma |
| 10,106,296 B2 | 10/2018 | LePinske |
| 10,246,862 B2 | 4/2019 | Santos |
| 2003/0167932 A1 | 9/2003 | Chen |
| 2005/0109774 A1 | 5/2005 | Orioles |
| 2005/0220939 A1 | 10/2005 | Morrow |
| 2007/0119744 A1 | 5/2007 | Metaxatos |
| 2009/0035433 A1 | 2/2009 | France et al. |
| 2009/0049650 A1 | 2/2009 | Cuillery et al. |
| 2009/0065509 A1 | 3/2009 | Schuler |
| 2009/0095754 A1 | 4/2009 | Liu |
| 2010/0230319 A1 | 9/2010 | Thomson |
| 2011/0056957 A1 | 3/2011 | Cheng |
| 2012/0198930 A1 | 8/2012 | Hood |
| 2012/0258224 A1 | 10/2012 | Salvino |
| 2013/0098920 A1 | 4/2013 | Lee |
| 2013/0248537 A1 * | 9/2013 | Lane ............... B65D 25/2888 220/574.3 |
| 2013/0306646 A1 | 11/2013 | Cheng |
| 2014/0224810 A1 | 8/2014 | Bar-Akiva |
| 2016/0010237 A1 | 1/2016 | Musil et al. |
| 2016/0054049 A1 | 2/2016 | Harvie |
| 2017/0238757 A1 | 8/2017 | Hengel et al. |
| 2017/0247143 A1 | 8/2017 | Gossens et al. |
| 2017/0290453 A1 | 10/2017 | Pittman |
| 2018/0125281 A1 | 5/2018 | Truong et al. |
| 2018/0170615 A1 | 6/2018 | Jacobson |
| 2018/0271331 A1 | 9/2018 | Lee |
| 2019/0142207 A1 | 5/2019 | Hollinger |

FOREIGN PATENT DOCUMENTS

| | | |
|---|---|---|
| DE | 8615346 U1 | 11/1987 |
| DE | 40008484-0004 | 11/2000 |
| DE | 40008484-0022 | 11/2000 |
| DE | 40200009-0006 | 2/2002 |
| DE | 40200009-0008 | 2/2002 |
| DE | 40200009-0009 | 2/2002 |
| DE | 40502400-0010 | 8/2005 |
| DE | 102009023000 A1 | 12/2010 |
| EM | 003742733-0006 | 2/2017 |
| EP | 0734672 A1 | 10/1996 |
| EP | 3210503 A1 | 2/2017 |
| JP | 2010-284219 A | 12/2010 |
| WO | 2006100367 A1 | 9/2006 |

OTHER PUBLICATIONS

Screen capture of YouTube video at https://www.youtube.com/watch?v=Vg6Th7p7gAk titled "Granite Stone Stackable-Stackmaster LF" retrieved Feb. 4, 2020.

Third-Party Observations Filed in European Application No. 19275051.1, dated Oct. 6, 2020, 99 pages.

* cited by examiner

STACKABLE AND NESTABLE COOKWARE HAVING A STABLE CONFIGURATION

CROSS-REFERENCE TO RELATED APPLICATIONS

This application is a continuation-in-part of pending U.S. patent application Ser. No. 16/245,814 filed Jan. 11, 2019, now U.S. Pat. No. 11,039,706, which claims priority from U.S. Provisional Patent Application Ser. No. 62/782,114, filed Dec. 19, 2018, both of which are incorporated by reference in their entirety for all purposes.

STATEMENT REGARDING PRIOR DISCLOSURES BY THE INVENTORS OR JOINT INVENTORS UNDER 37 C.F.R. 1.77(b)(6)

Stackable cookware sets and cookware items were offered for sale and sold by the applicant/assignee E. Mishan & Sons, Inc., less than one year before the filing date of the present application, under the trademarks STACKMASTER, GRANITE STONE, and GOTHAM STEEL. The applicant/assignee obtained the stackable cookware technology directly or indirectly from Fred Hollinger, the named inventor of the present application. Said stackable cookware sets and cookware items are "inventor-originated disclosures" within the exceptions defined in 35 U.S.C. 102(b)(1).

FIELD AND BACKGROUND OF THE INVENTION

The subject technology relates to household or commercial cookware items, for example, pots and pans, which are structured and configured to stack and nest together. It is desirable for a stack of cookware items to be stacked and nested in a stable configuration, so that the stacked and nested items have little or no tendency to rock or shift within the stack when the stack is moved by a user, or when items are added to the stack. Cookware items may include attached handles extending from the items, which may impede the ability of these items to stack and nest in a stable configuration. A simple, rugged and low-cost design is also desirable for cookware items.

SUMMARY OF THE INVENTION

According to an aspect of the subject technology, a set of cookware, for example a set of pots and pans, consists of individual cookware items sized in a series of increasing diameters, or having tapering walls, so they can nest together. At least some of the cookware items are provided with one or more stops attached to the outside of the items, to support the nested items by contacting the lip or rim of the lower items into which they are nested.

Preferably, without limitation, a stop for a stacked cookware item according to the subject technology consists of a horizontal bar attached to the outer surface of the cookware item. A cookware item may have one, two, or more stops attached to its outer surface. To improve the stability of the stacked configuration, according to an aspect of the subject technology, the stop or stops of an item contact the rim or lip of the next lower item in the stack at exactly three or exactly four contact points. Preferably, the three or four contact points are co-planar, i.e. are lying in the same plane, so that the upper cookware item is supported in a stable configuration on the lower cookware item, with little or no tendency to rock. The number of contact points is determined by the configuration of the lower edges of the stops. A stop having a non-linear lower edge may provide for exactly one or exactly two contact points, as described herein. Thus, a cookware item having two stops may have exactly three or exactly four contact points with the rim or lip of next lower item (i.e. the item into which it is nested).

In other embodiments, the stops are substantially flat on the bottom, i.e. substantially without nibs or projections on the bottom surface, such that when the item is stacked on another cookware item, the stops contact the rim of the lower cookware item along an extent of their lengths.

In other embodiments, outwardly-extending handles may be integrated into stops. For example, a U-shaped or linear (stick) handle may extend from a stop, for example, from the upper edge of a stop.

DETAILED DESCRIPTION OF THE INVENTION

Figure 1:
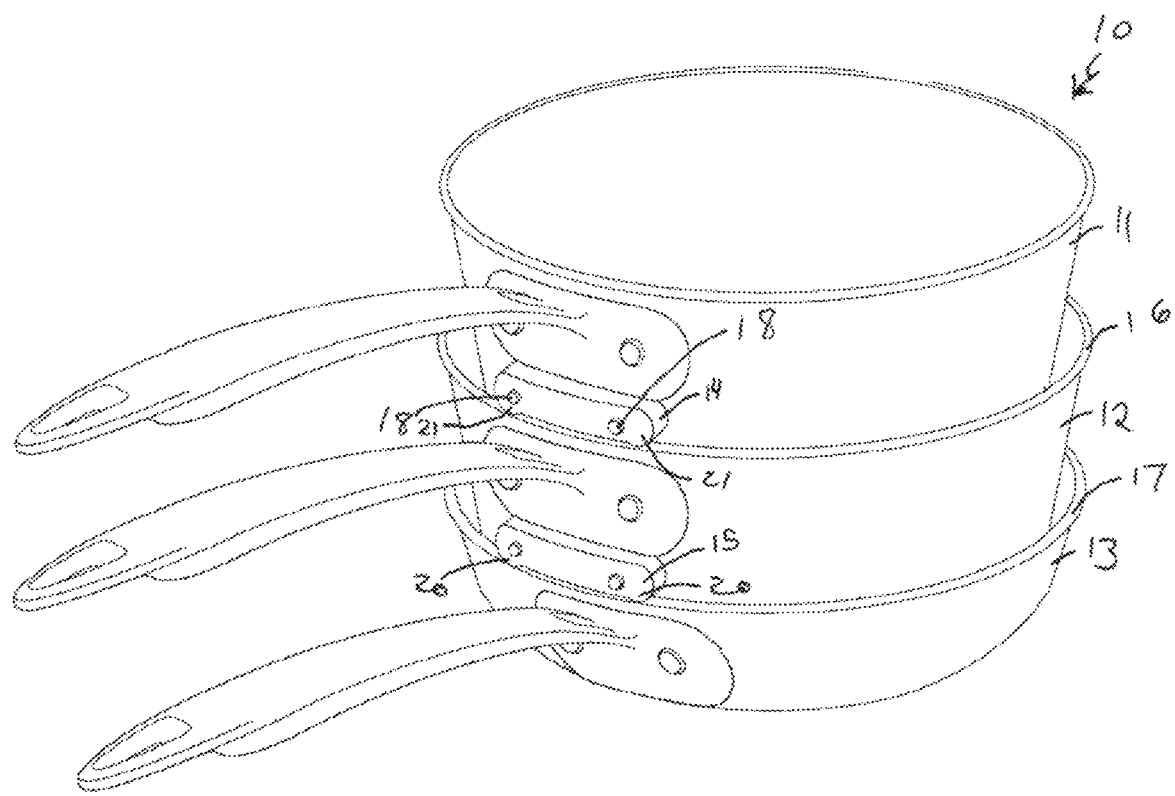
FIG. 1 is a perspective view of cookware items stacked and nested in a stable configuration according to a non-limiting embodiment of the subject technology.
Figure 2:
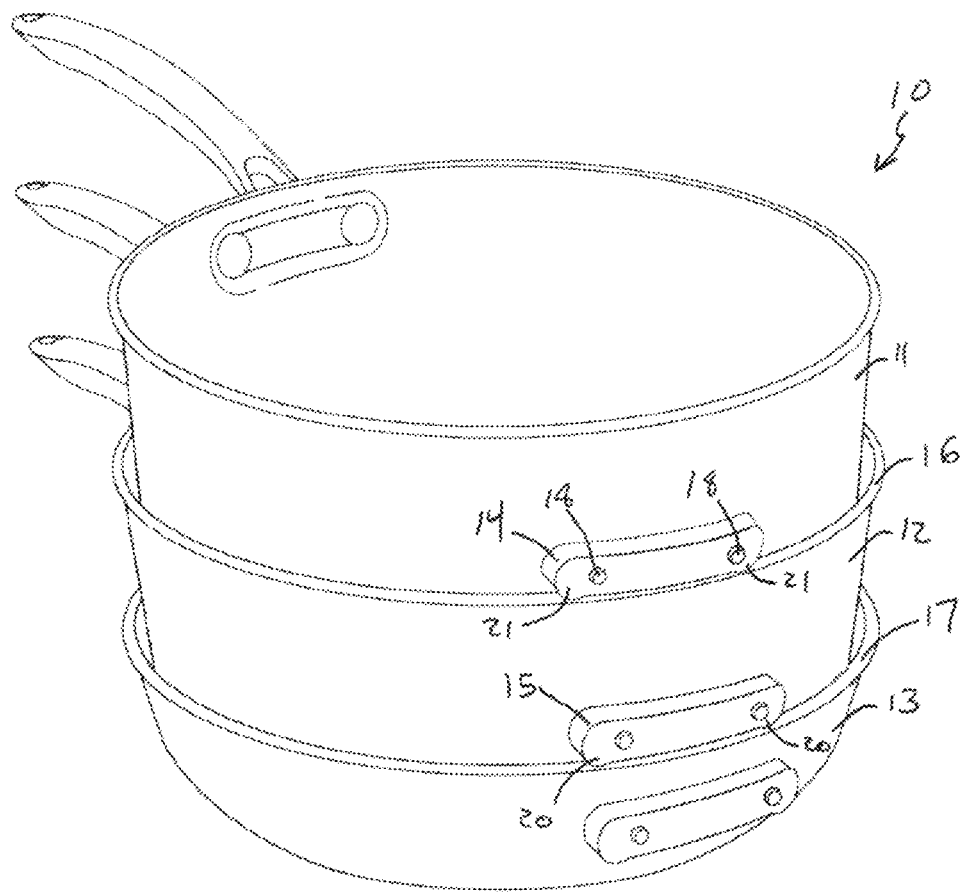
FIG. 2 is a perspective view of cookware items stacked and nested in a stable configuration according to a non-limiting embodiment of the subject technology.
Figure 3:
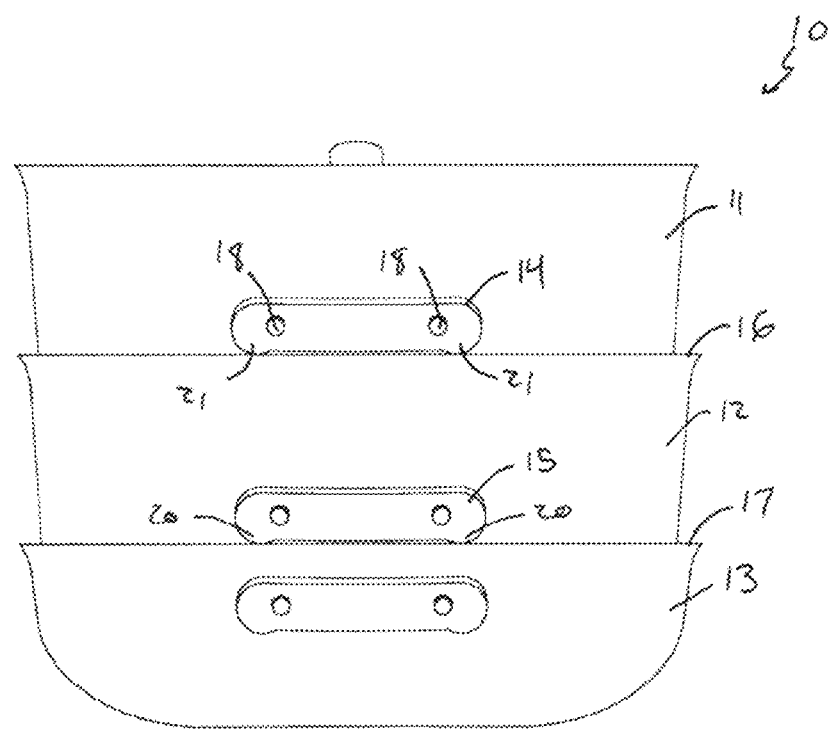
FIG. 3 is a front view of cookware items stacked and nested in a stable configuration according to a non-limiting embodiment of the subject technology.
Figure 4:
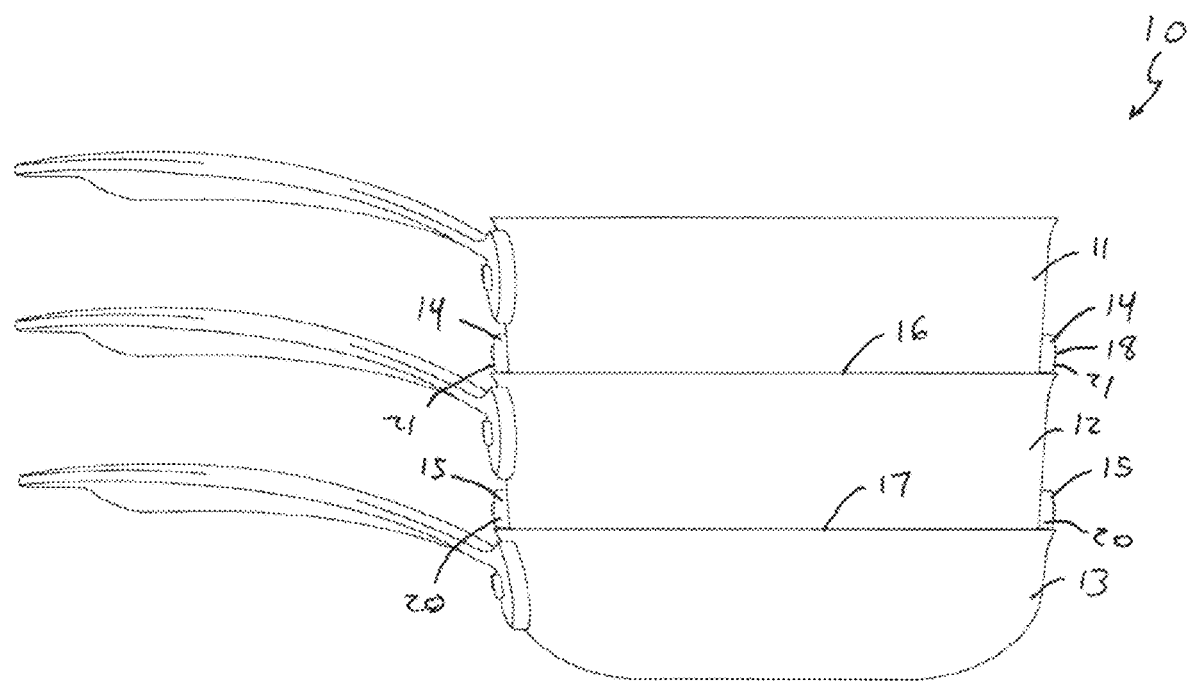
FIG. 4 is a right-side view of cookware items stacked and nested in a stable configuration according to a non-limiting embodiment of the subject technology.
Figure 5:
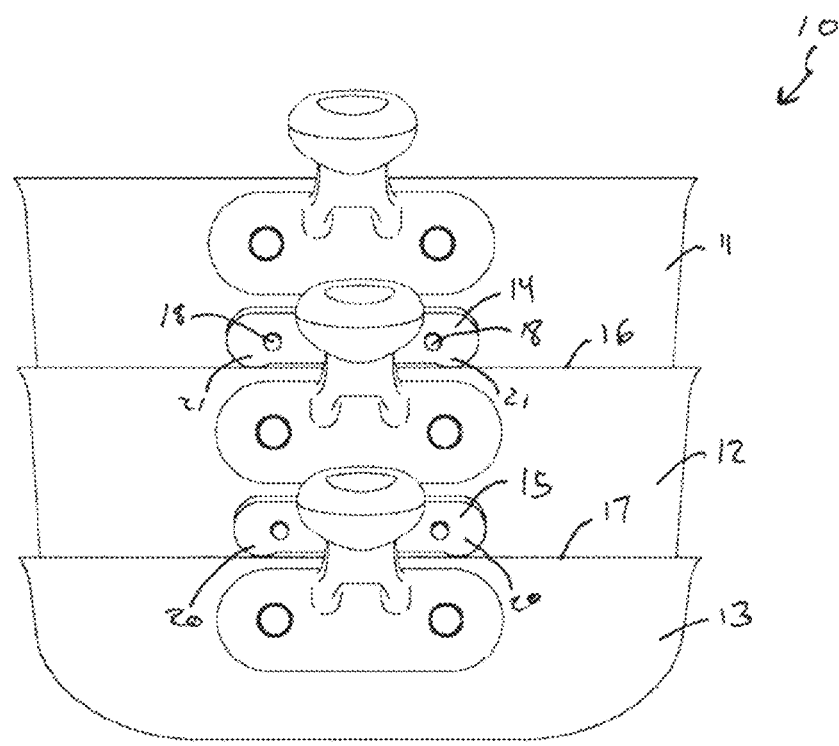
FIG. 5 is a rear view of cookware items stacked and nested in a stable configuration according to a non-limiting embodiment of the subject technology.
Figure 6:
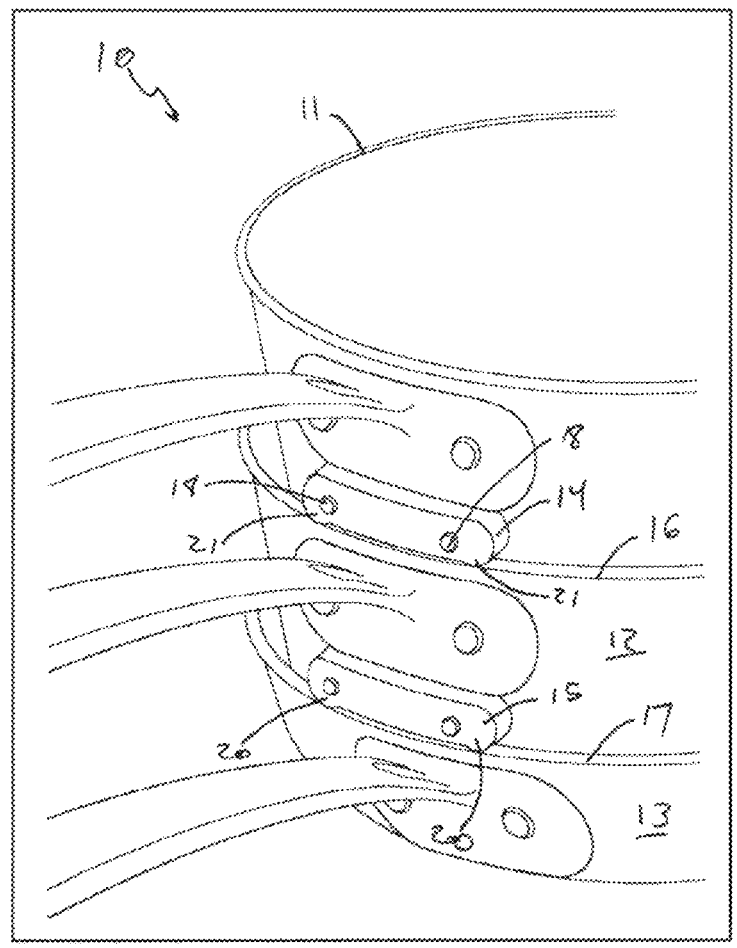
FIG. 6 is a perspective view of a detail of cookware items stacked and nested in a stable configuration according to a non-limiting embodiment of the subject technology.
Figure 7:
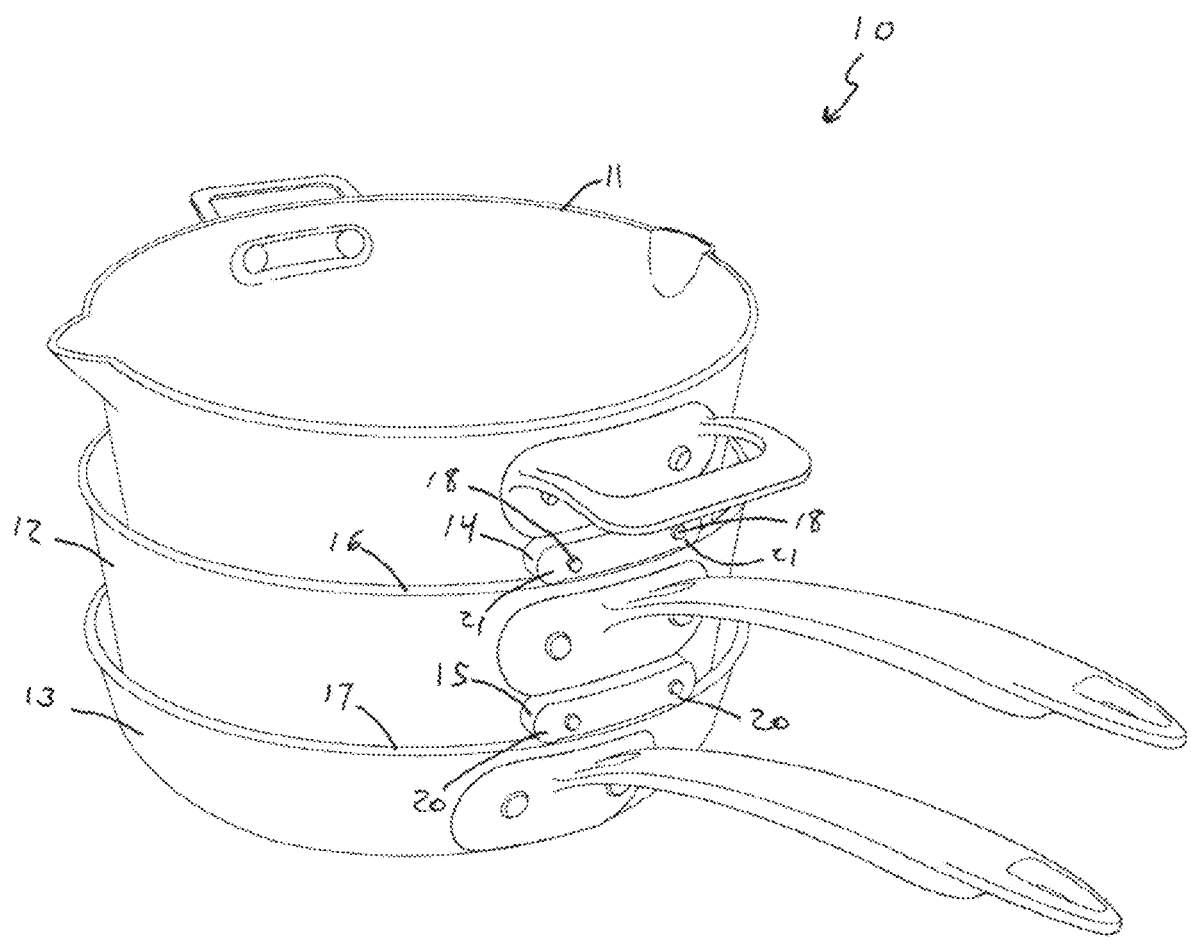
FIG. 7 is a perspective view of cookware items stacked and nested in a stable configuration according to a non-limiting embodiment of the subject technology.
Figure 8:
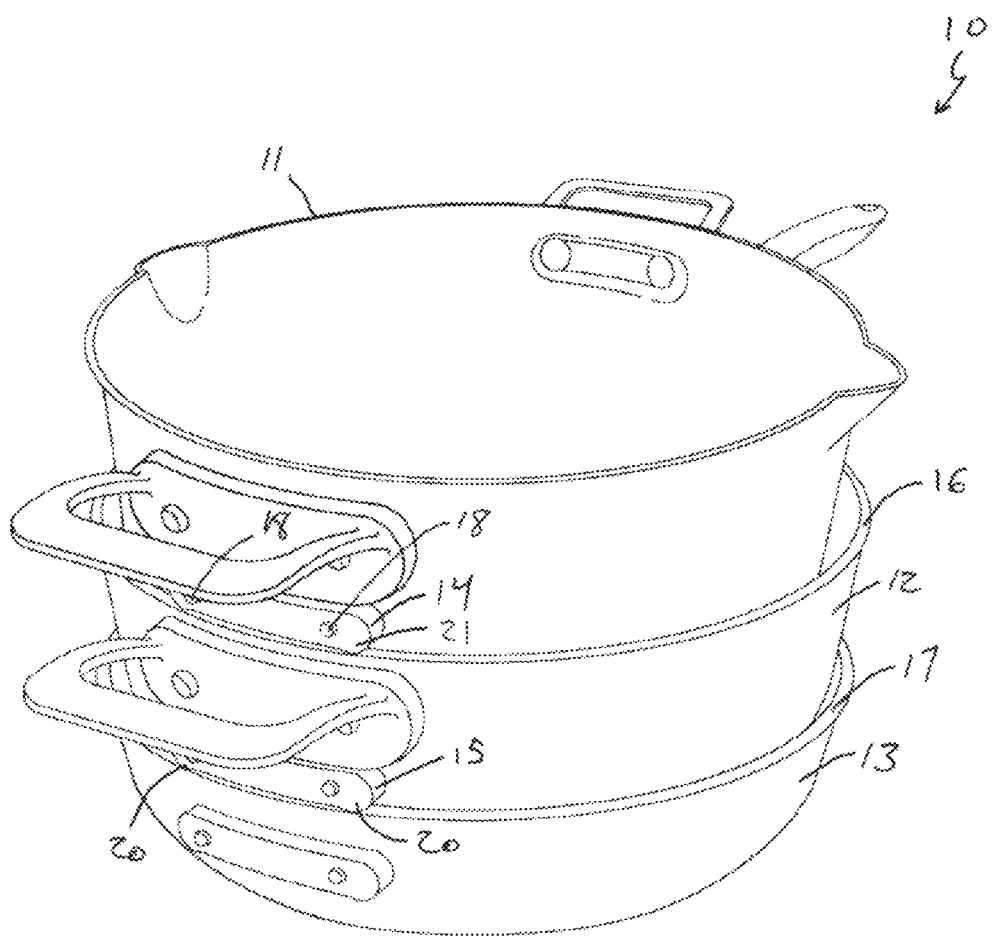
FIG. 8 is a perspective view of cookware items stacked and nested in a stable configuration according to a non-limiting embodiment of the subject technology.
Figure 9:
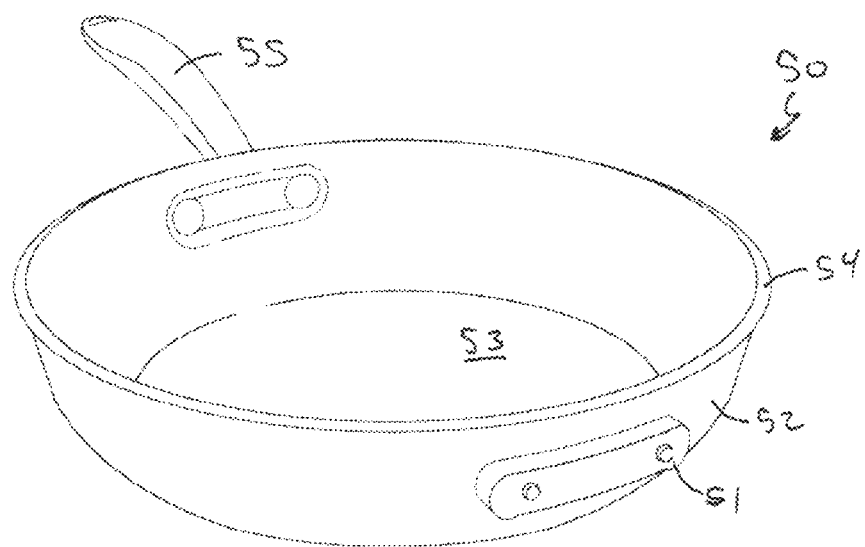
FIG. 9 is a perspective view of a pan configured to be stacked and nested in a stable configuration according to a non-limiting embodiment of the subject technology.
Figure 10:
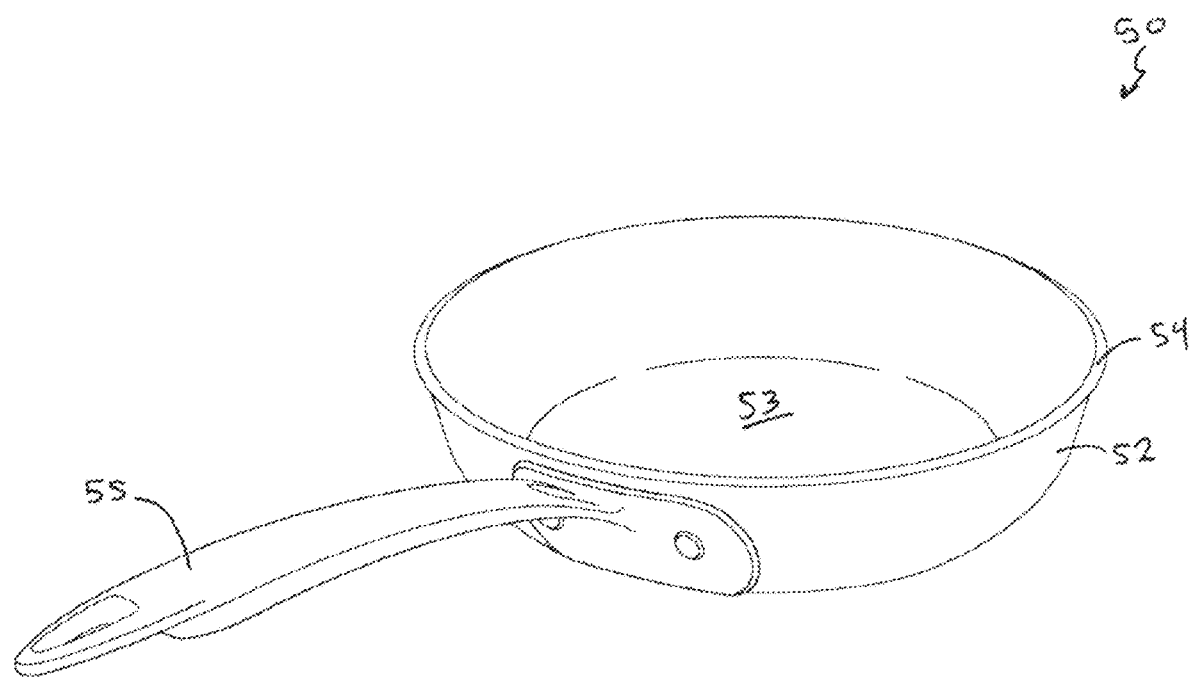
FIG. 10 is a perspective view of a pan configured to be stacked and nested in a stable configuration according to a non-limiting embodiment of the subject technology.
Figure 11:
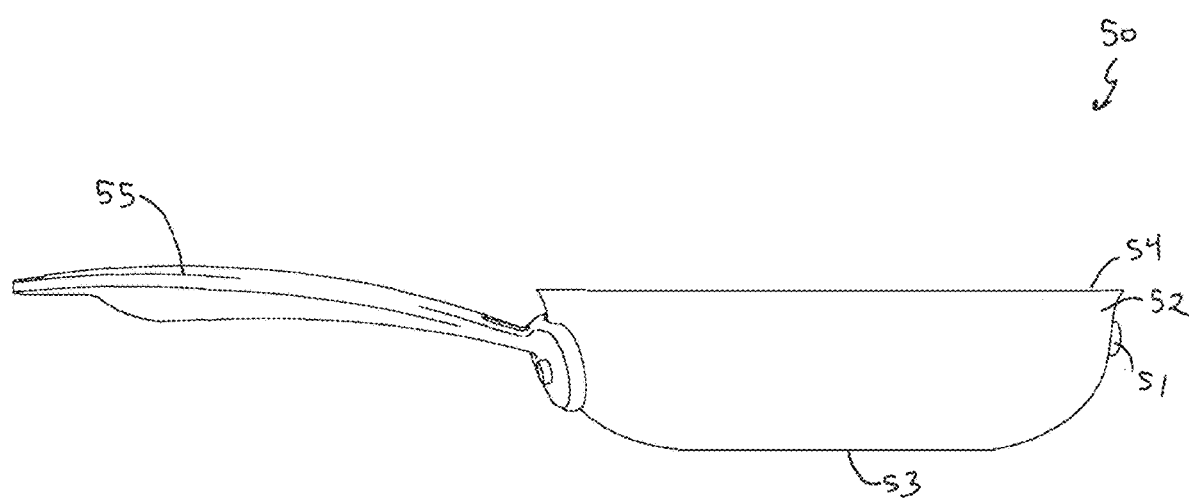
FIG. 11 is a right-side view of a pan configured to be stacked and nested in a stable configuration according to a non-limiting embodiment of the subject technology.
Figure 12:
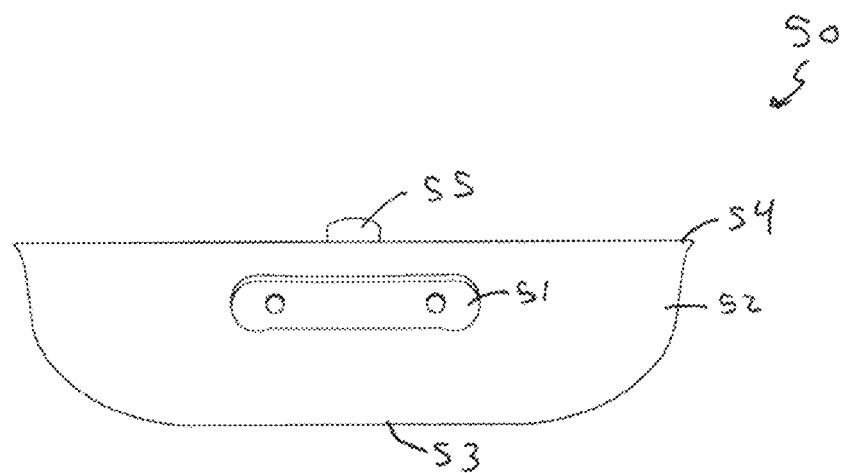
FIG. 12 is a front view of a pan configured to be stacked and nested in a stable configuration according to a non-limiting embodiment of the subject technology.
Figure 13:
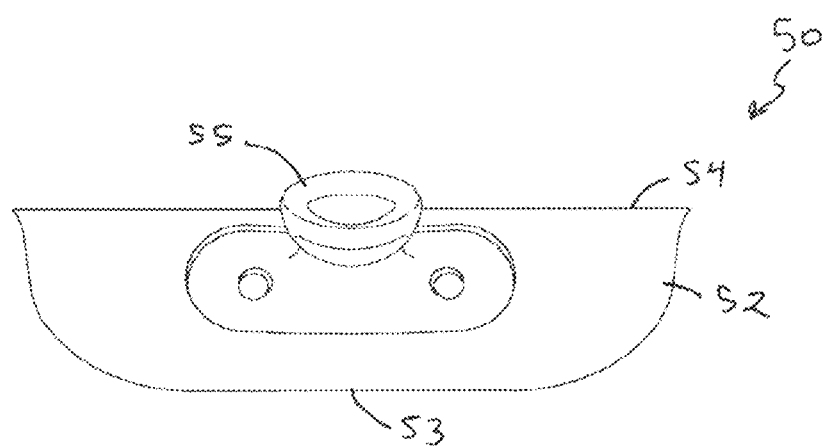
FIG. 13 is a rear view of a pan configured to be stacked and nested in a stable configuration according to a non-limiting embodiment of the subject technology.
Figure 14:
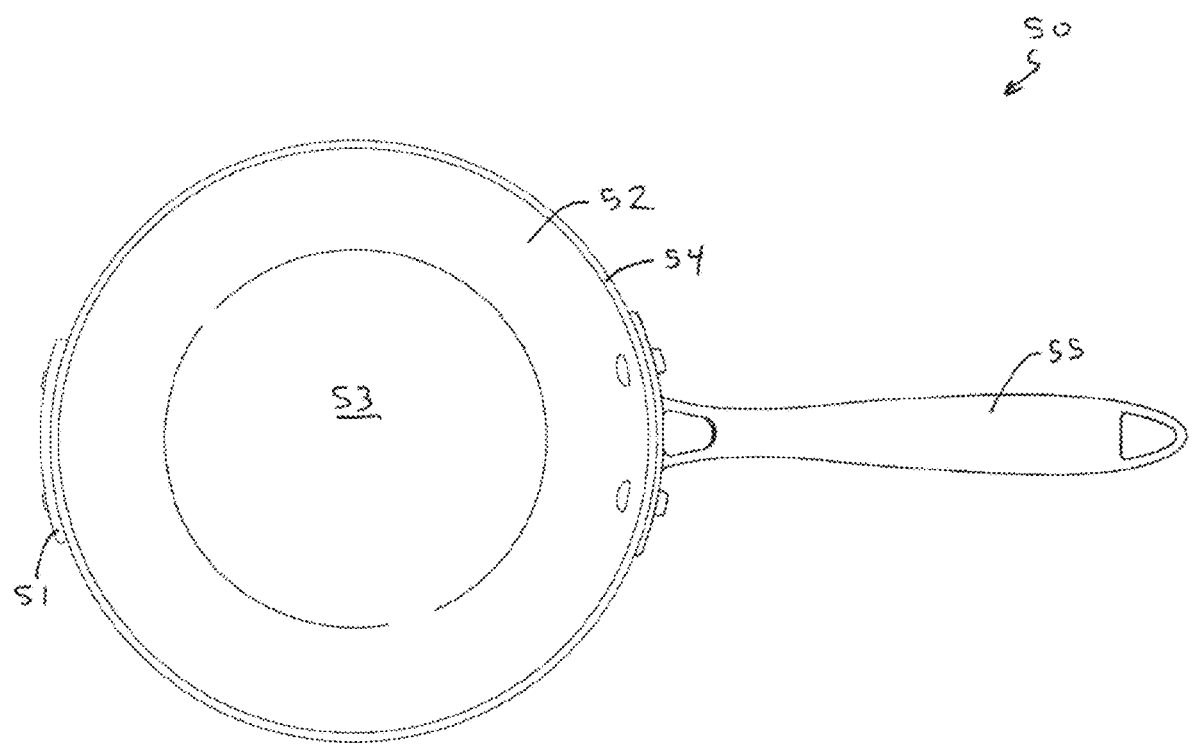
FIG. 14 is a plan view of a pan configured to be stacked and nested in a stable configuration according to a non-limiting embodiment of the subject technology.
Figure 15:
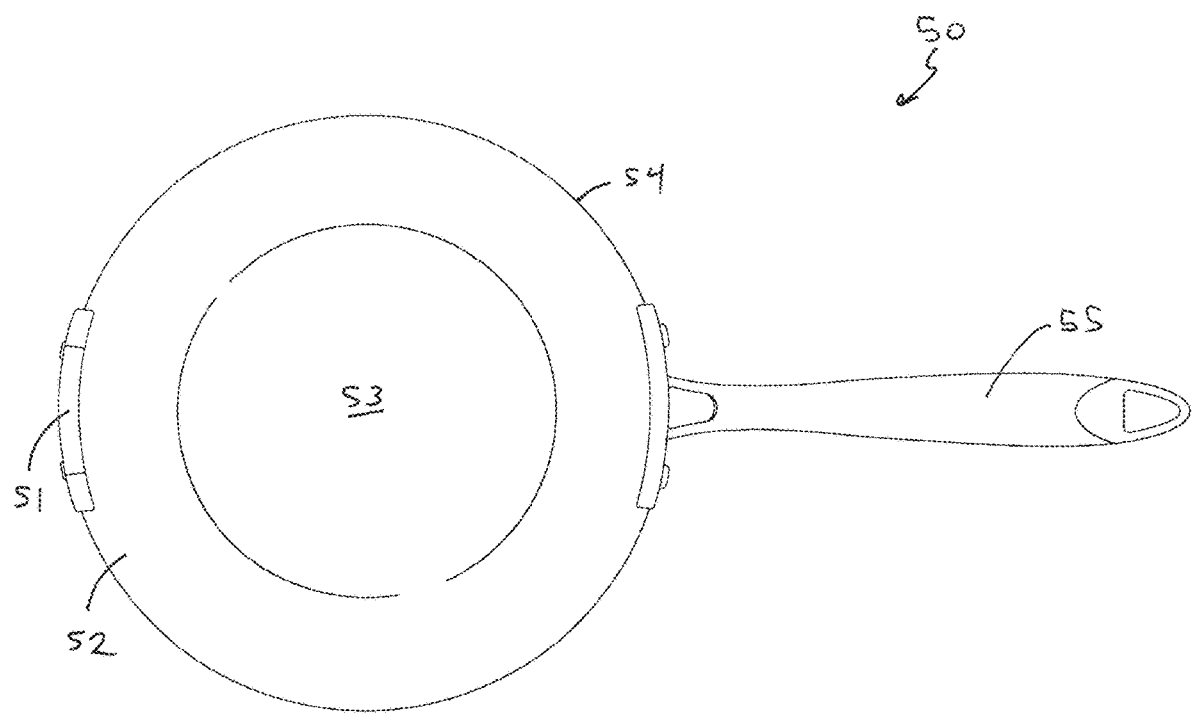
FIG. 15 is a bottom view of a pan configured to be stacked and nested in a stable configuration according to a non-limiting embodiment of the subject technology.
Figure 16:
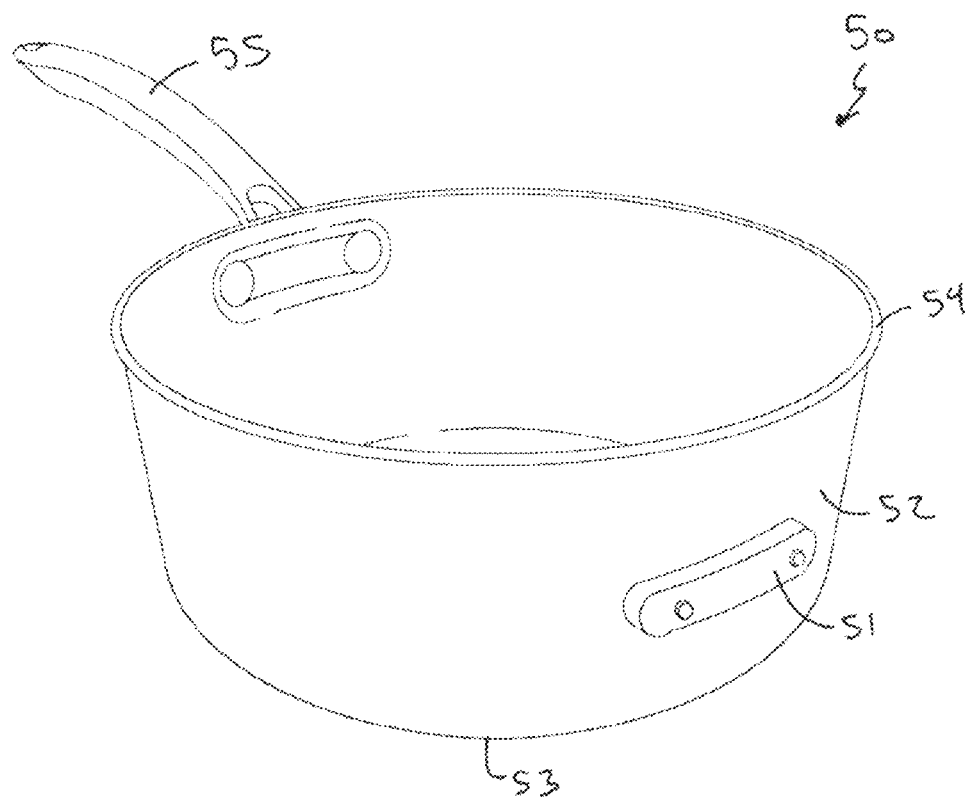
FIG. 16 is a perspective view of a first pot configured to be stacked and nested in a stable configuration according to a non-limiting embodiment of the subject technology.
Figure 17:
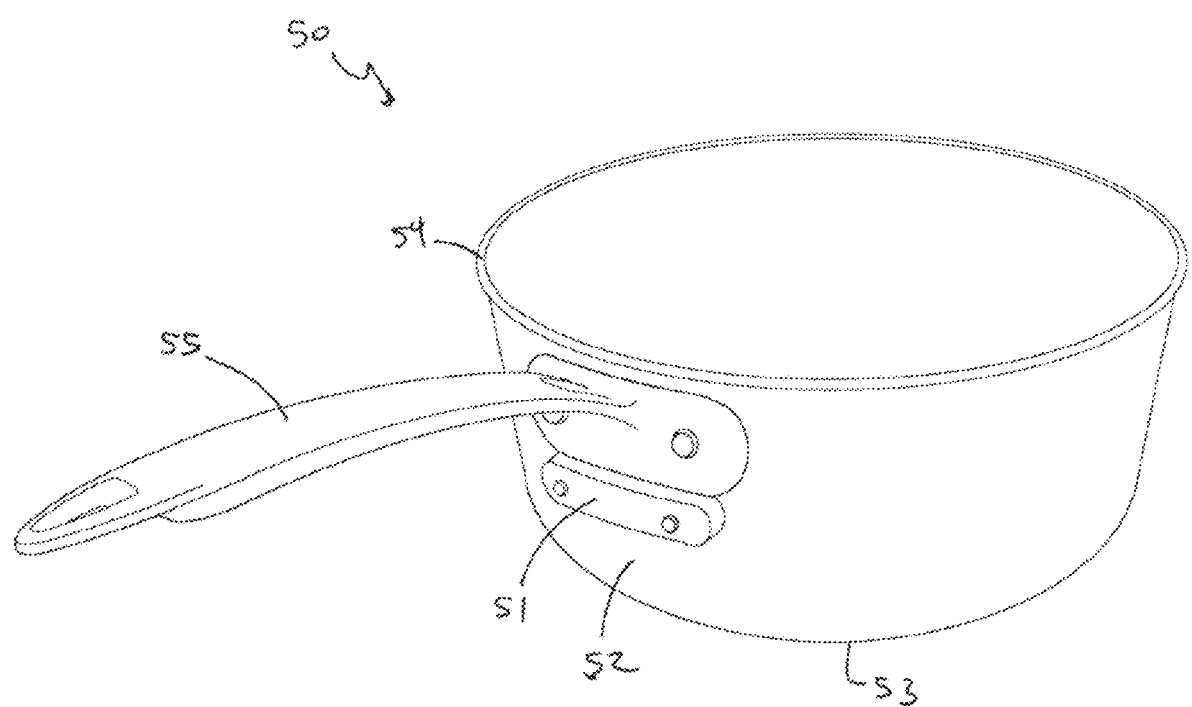
FIG. 17 is a perspective view of a first pot configured to be stacked and nested in a stable configuration according to a non-limiting embodiment of the subject technology.
Figure 18:
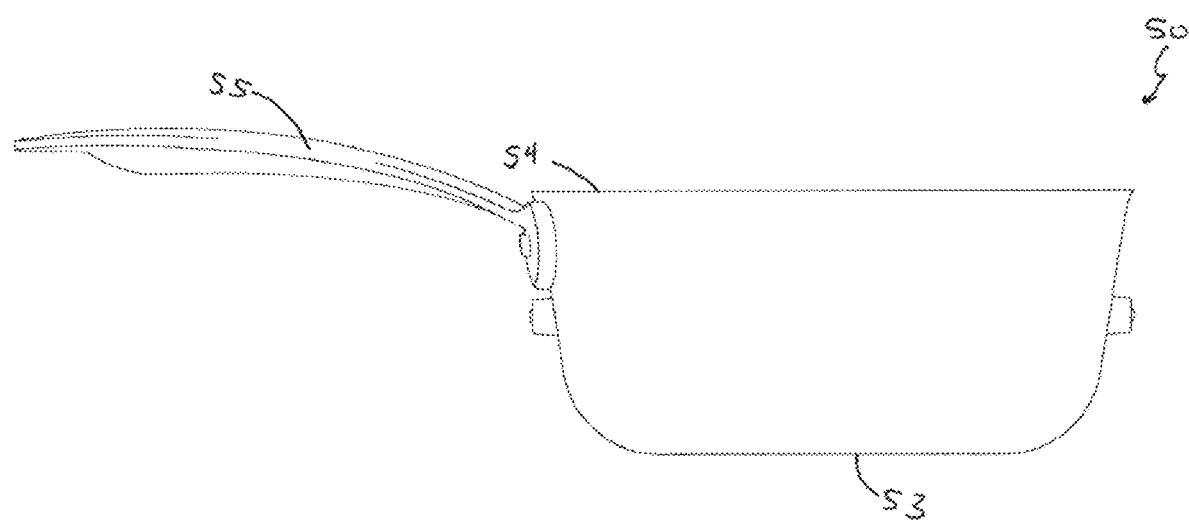
FIG. 18 is a right-side view of a first pot configured to be stacked and nested in a stable configuration according to a non-limiting embodiment of the subject technology.

According to a non-limiting aspect of the subject technology, the Figures show views of cookware items and of nested stacks of three cookware items. Each cookware item has a base, and a wall rising from the base and integral with the base, which terminates at an integral lip or rim at the top of the item. The items are sized and shaped to stack in a nesting configuration as shown, for example, in FIGS. 1-8. Each item has an internal diameter, and to enable nesting, the internal diameter of each item is at least slightly smaller than the item beneath it in the stack. Alternatively, to enable nesting, the walls of the items taper outward from the base toward the lip or rim. It will be understood that a stack of nested cookware items according to the subject technology could have as few as two items and more than three items.

As shown in the non-limiting embodiments of FIGS. 1-8, according to the subject technology, a nested stack 10 of three cookware items, specifically a top item 11, middle item 12, and bottom item 13 is maintained in a stable configuration by stops 14 attached to the outer surface of top item 11 and stops 15 attached to middle item 12. Stops 14 attached to top item 11 contact the rim 16 of middle item 12. Stops 15 attached to middle item 12 contact the rim 17 of bottom item 13. In this embodiment, items 11, 12 have two attached stops 14, 15, disposed on opposite sides of each item as shown. Preferably, these stop-to-rim contacts are the only points of contact between the nested items 11, 12, 13, i.e., the walls and/or bases of the items are not in contact.

The stops 14, 15 are attached to the exterior of the walls of the items 11, 12, 13, by welding for example, or are attached by fasteners 18 (only one pair of fasteners is numbered) such as rivets, bolts or screws through small holes formed in the walls for that purpose. Preferably the stops are curved to conform to the curvature, if any, of the walls to which they are attached. Preferably, for attachment to a cookware item with tapering or sloping outer walls, the surface of the stop facing the wall (i.e. the inner surface) is likewise tapered or sloped to conform to the wall. The opposite (i.e. outer) surface of the stop may be tapered, sloped, or square, with respect to the side walls of the stop. The stops have a thickness extending outwardly from the exterior walls. The thickness of a stop may be 5 mm, or approximately 5 mm, or in the range of 3 mm to 10 mm, or in the range of approximately 3 mm to approximately 10 mm. The thickness of a stop should be sufficient to enable it to rest on the rim of the lower item in a stack, and it need not be any thicker. In particular, a stop need not be thick enough, and extend from the exterior wall far enough, to be functional as a handle. The stops are preferably solid and made of a rigid material that is oven-safe, for example, metal, steel, aluminum, titanium, ceramic or oven-safe polymer material. As an alternative to attaching a stop to the wall of a cookware item, the stop may be formed integrally with the wall of the item.

According to an aspect of the subject technology, preferably, the lower surface of a stop is adapted to contact the rim of the lower item in the stack at a limited number of contact points. For example, in the non-limiting embodiments of FIGS. 1-8, the lower surface of each stop 14 has two nibs or radii 21 at opposite ends of the stop, to contact the rim 12 of middle item 16 at exactly two contact points with respect to each stop. Thus, top item 11 contacts middle item 12 at exactly four points. Similarly, the lower surfaces of stops 15 are shaped to contact the rim 17 of middle items 13 at two nibs or radii 20 with respect to each stop, such that middle item 12 contacts bottom item at exactly four contact points.

Although the Figures show nested and stacked sets of three cookware items, it will be understood that a stacked set of two items, or more than three items, could be within the scope of the subject technology.

According to another aspect of the subject technology, a single item of stackable cookware is provided with a stop or stops as described herein, adapted to be stacked in a stable configuration with other cookware as described herein, for example those shown in FIGS. 9-35. As shown in FIGS. 9-35, a single item of cookware 50 according to the subject technology has one or more stops 51 attached to a wall 52 of the item, the wall rising from base 53 to rim 54. In various embodiments, cookware 50 may have a straight handle 55 or loop handle 56, or both, attached between a stop, or stops, 51 and rim 54.

Figure 19:
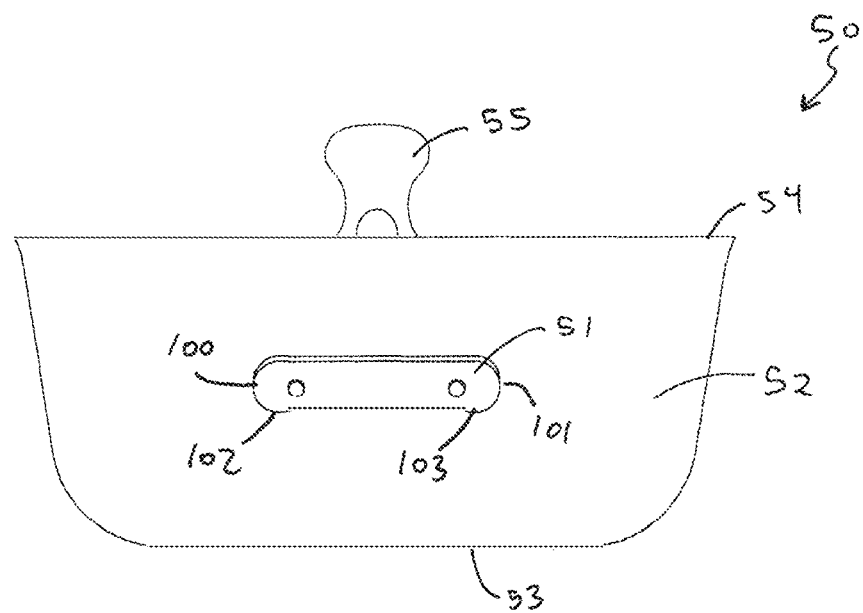
FIG. 19 is a front view of a first pot configured to be stacked and nested in a stable configuration according to a non-limiting embodiment of the subject technology.
Figure 20:
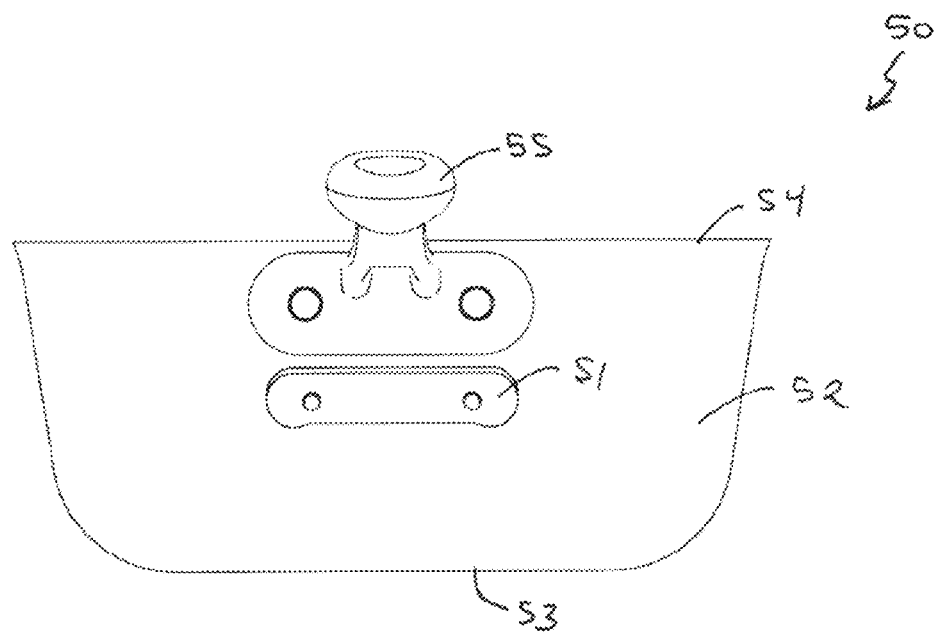
FIG. 20 is a rear view of a first pot configured to be stacked and nested in a stable configuration according to a non-limiting embodiment of the subject technology.
Figure 21:
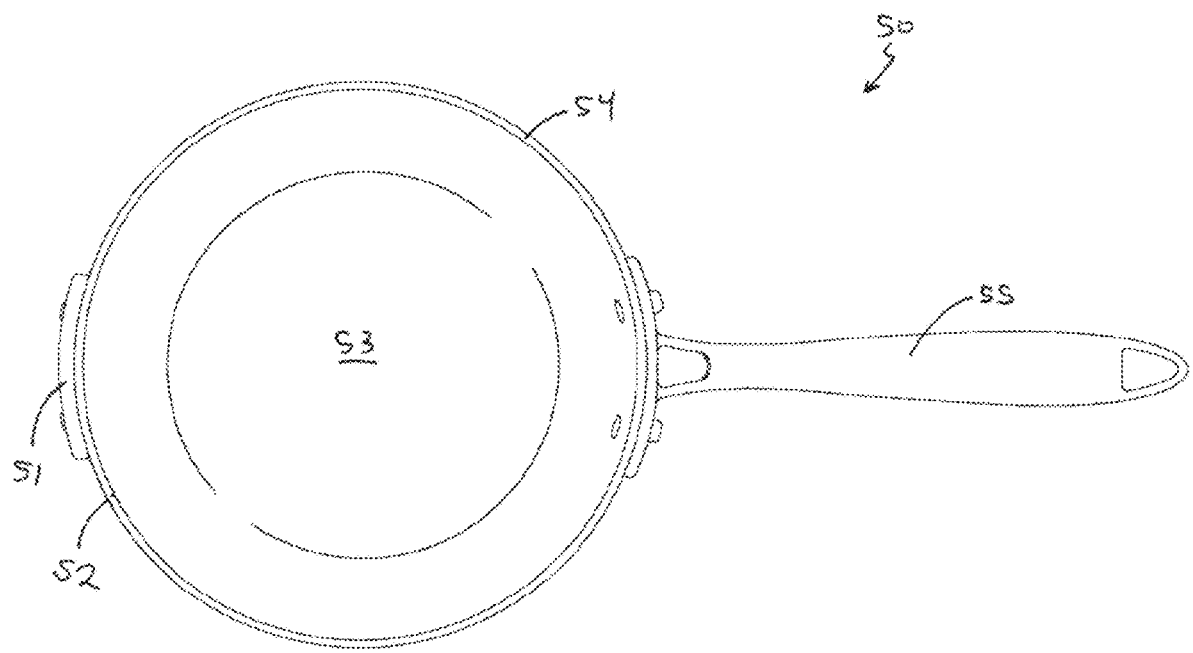
FIG. 21 is a plan view of a first pot configured to be stacked and nested in a stable configuration according to a non-limiting embodiment of the subject technology.
Figure 22:
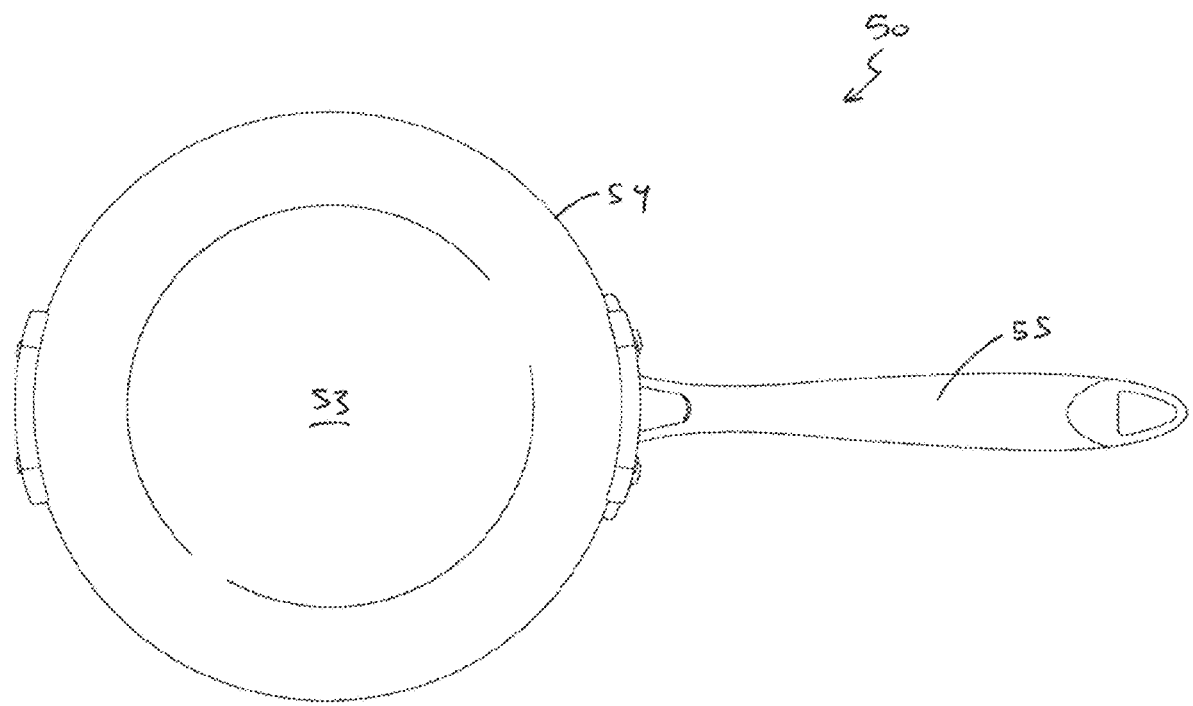
FIG. 22 is a bottom view of a first pot configured to be stacked and nested in a stable configuration according to a non-limiting embodiment of the subject technology.
Figure 23:
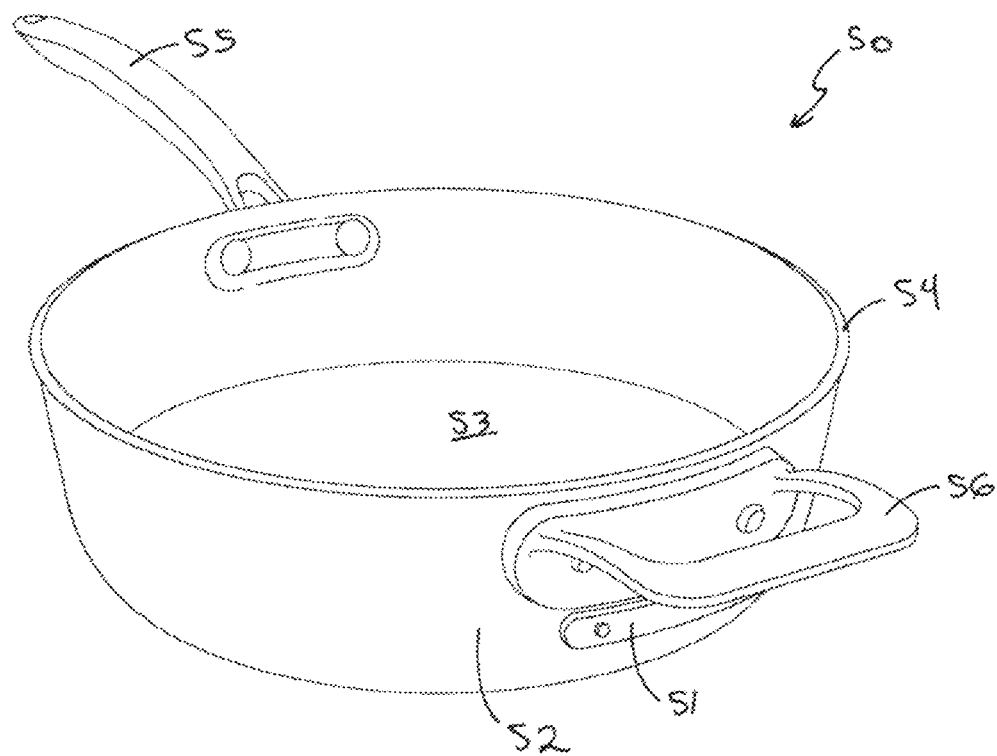
FIG. 23 is a perspective view of a second pot configured to be stacked and nested in a stable configuration according to a non-limiting embodiment of the subject technology.
Figure 24:
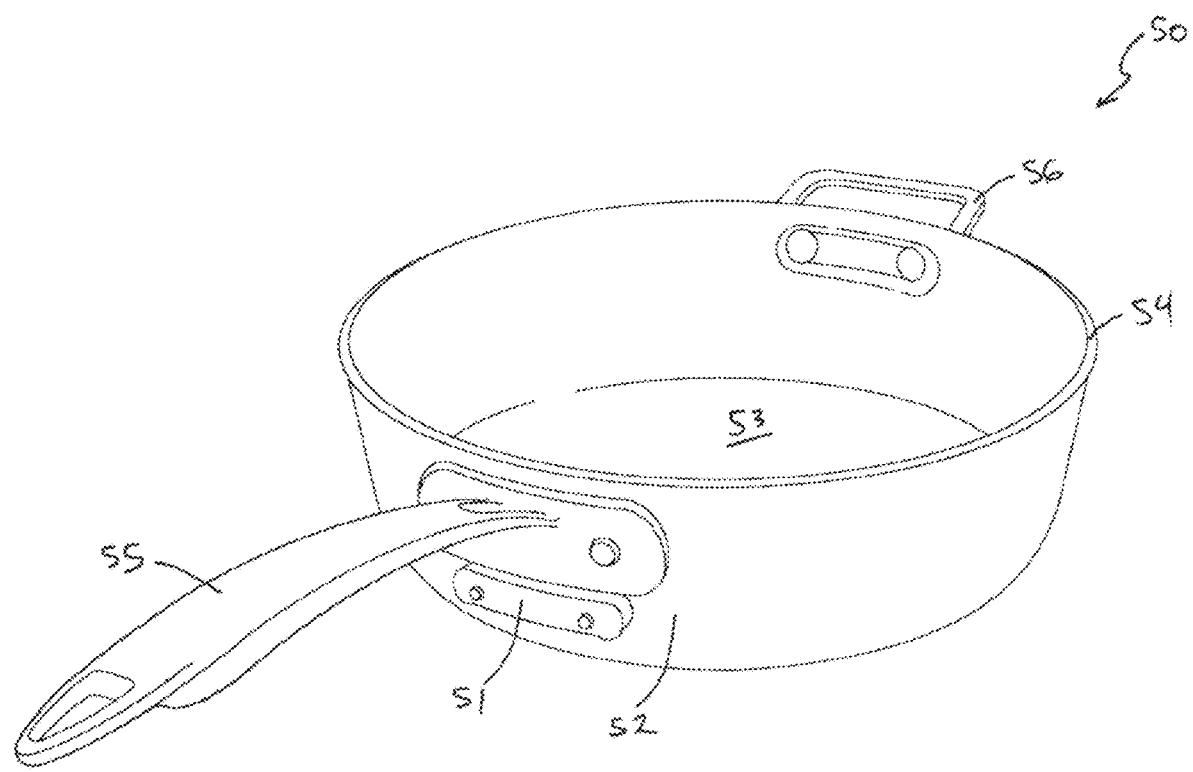
FIG. 24 is a perspective view of a second pot configured to be stacked and nested in a stable configuration according to a non-limiting embodiment of the subject technology.
Figure 25:
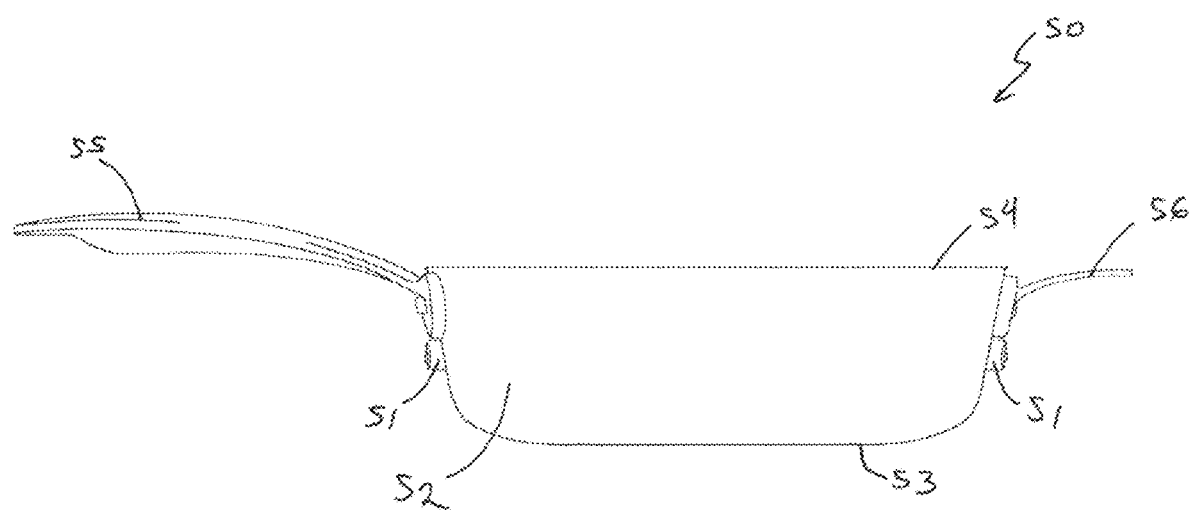
FIG. 25 is a right-side view of a second pot configured to be stacked and nested in a stable configuration according to a non-limiting embodiment of the subject technology.
Figure 26:
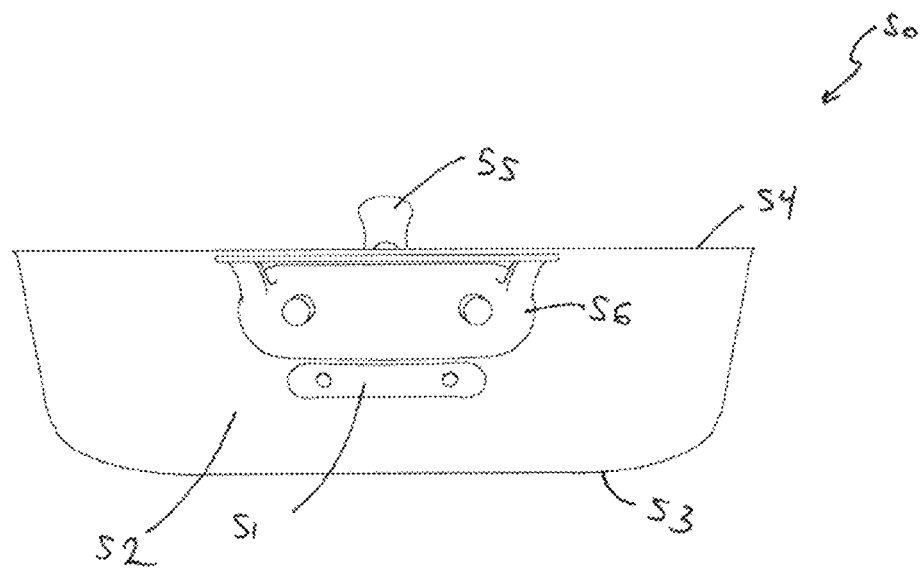
FIG. 26 is a front view of a second pot configured to be stacked and nested in a stable configuration according to a non-limiting embodiment of the subject technology.
Figure 27:
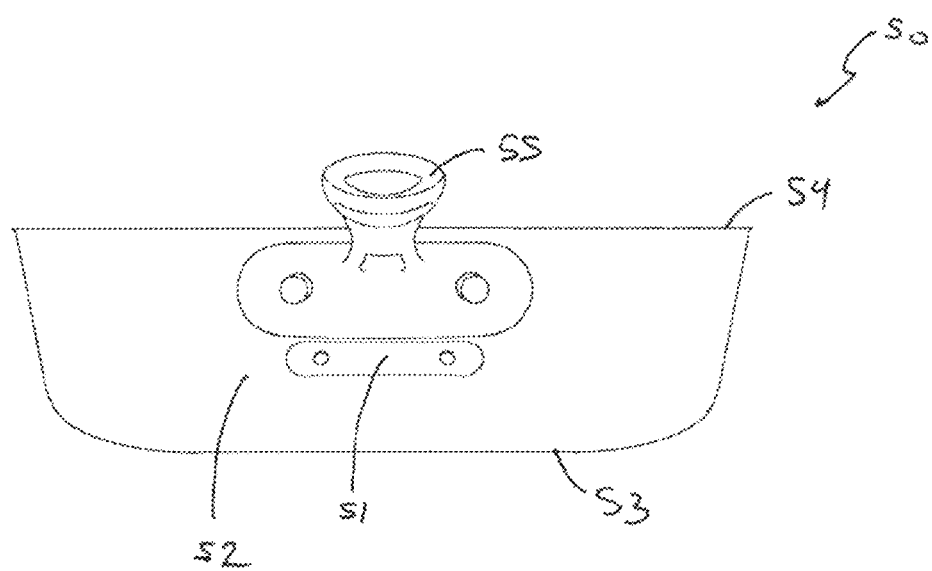
FIG. 27 is a rear view of a second pot configured to be stacked and nested in a stable configuration according to a non-limiting embodiment of the subject technology.
Figure 28:
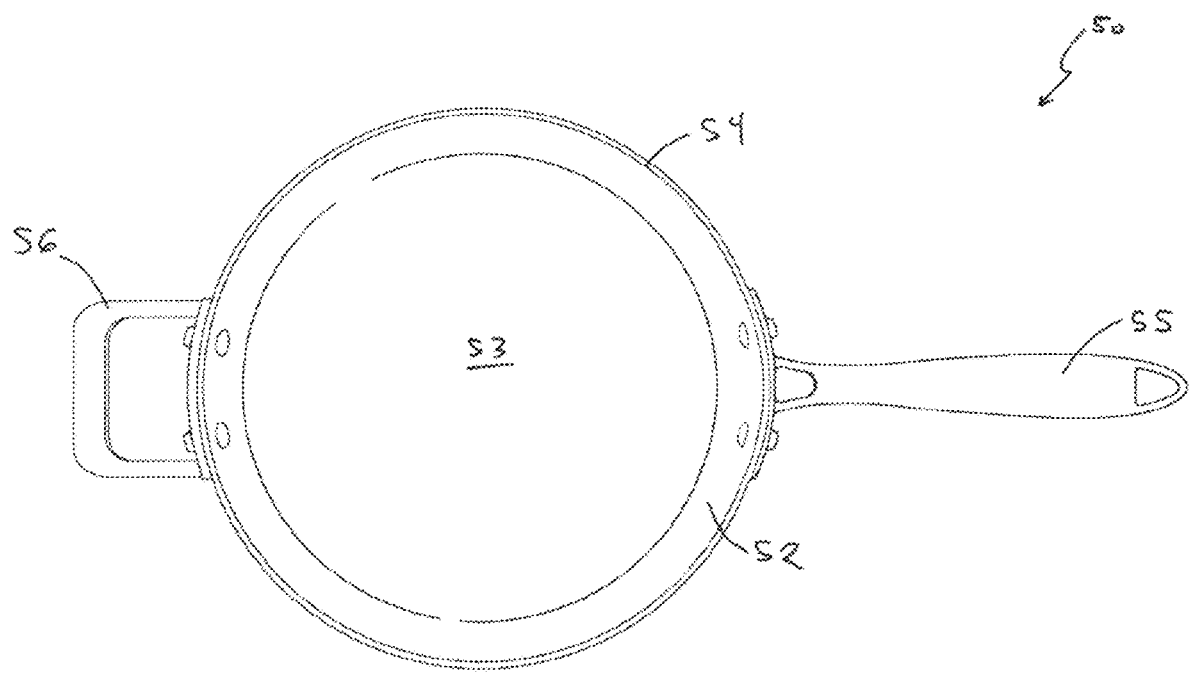
FIG. 28 is a plan view of a second pot configured to be stacked and nested in a stable configuration according to a non-limiting embodiment of the subject technology.
Figure 29:
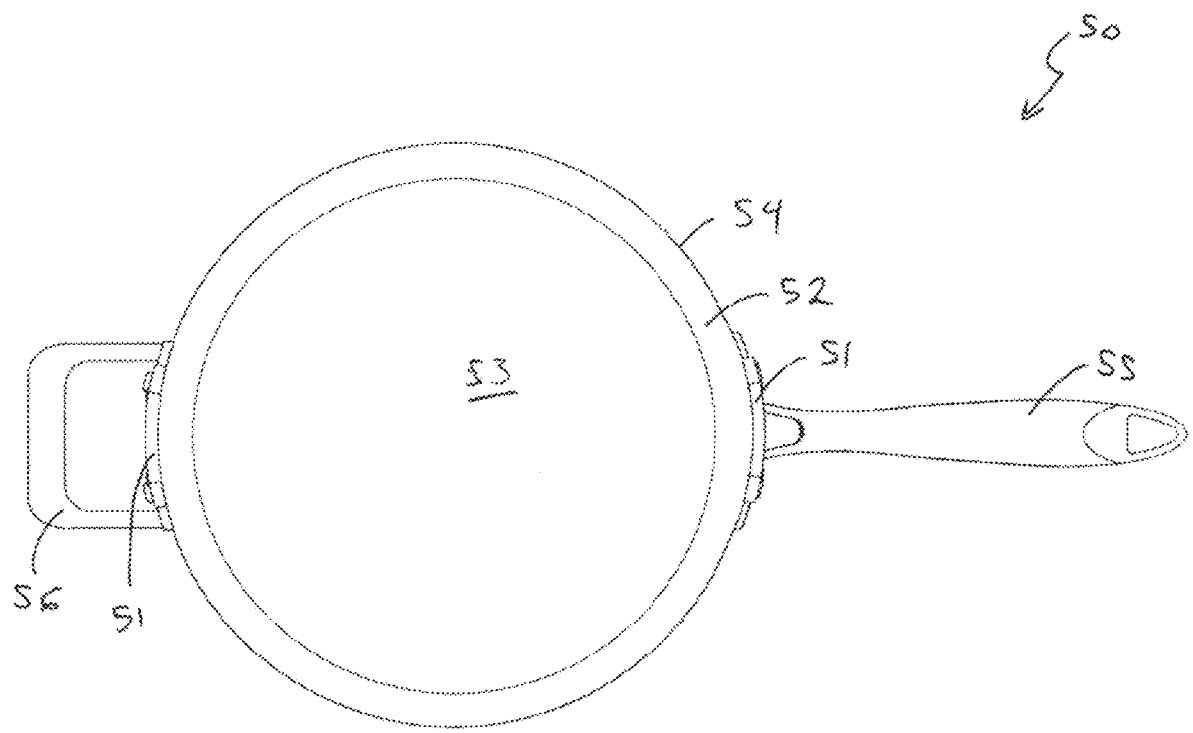
FIG. 29 is a bottom view of a second pot configured to be stacked and nested in a stable configuration according to a non-limiting embodiment of the subject technology.
Figure 30:
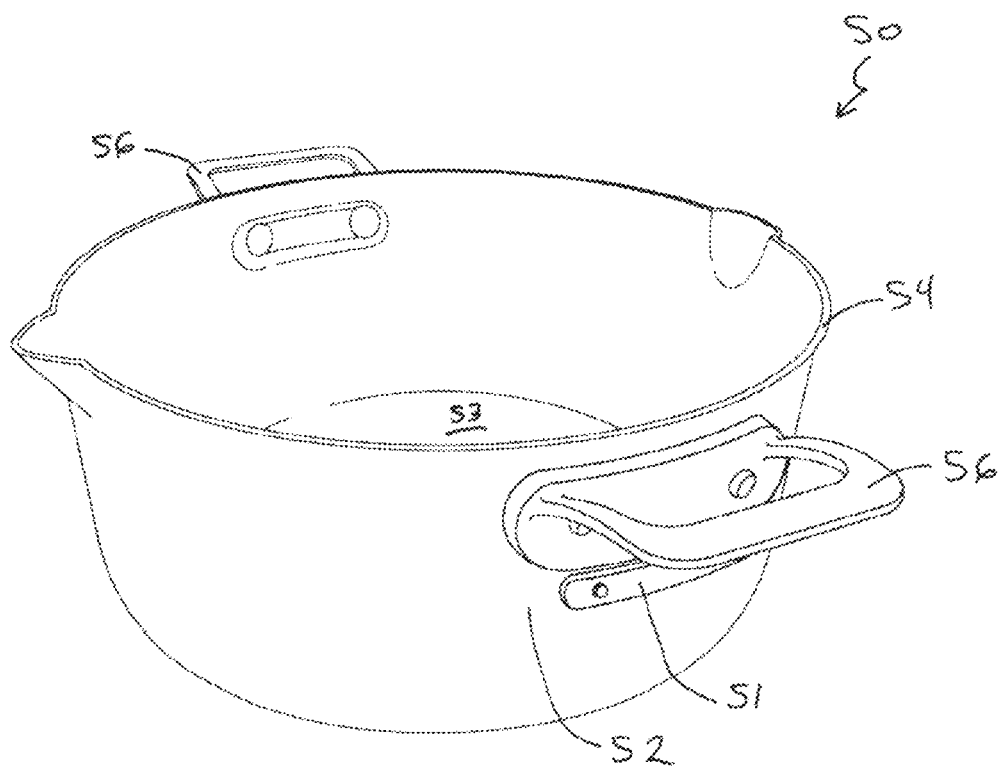
FIG. 30 is a perspective view of a third pot configured to be stacked and nested in a stable configuration according to a non-limiting embodiment of the subject technology.
Figure 31:
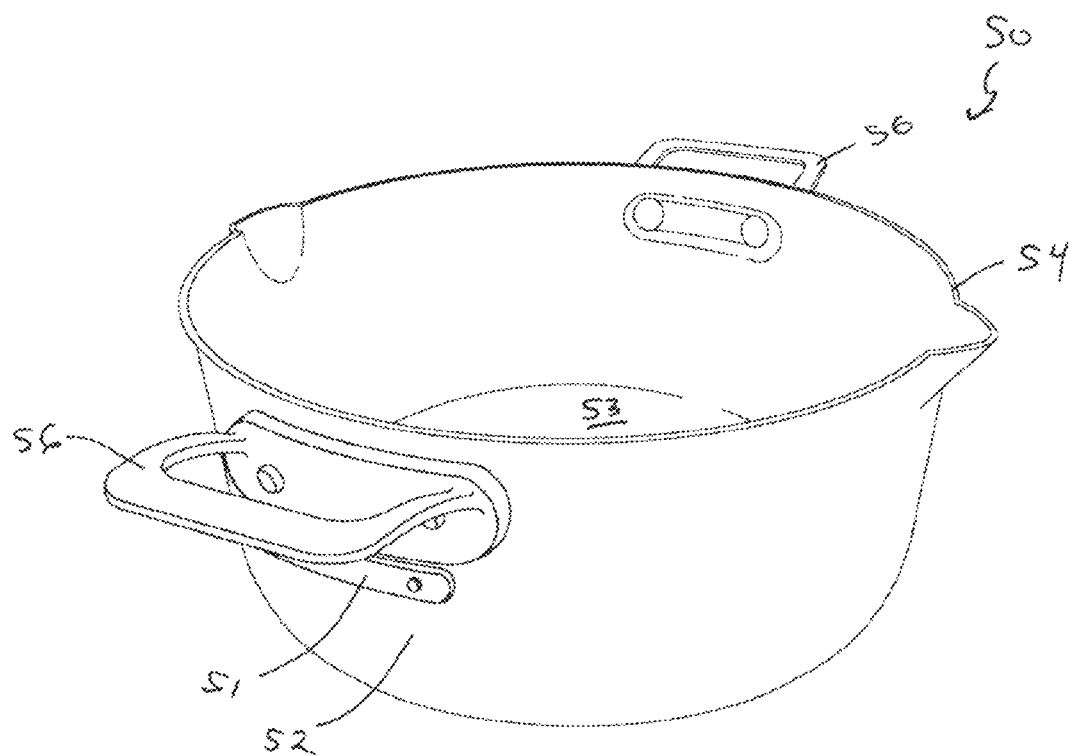
FIG. 31 is a perspective view of a third pot configured to be stacked and nested in a stable configuration according to a non-limiting embodiment of the subject technology.
Figure 32:
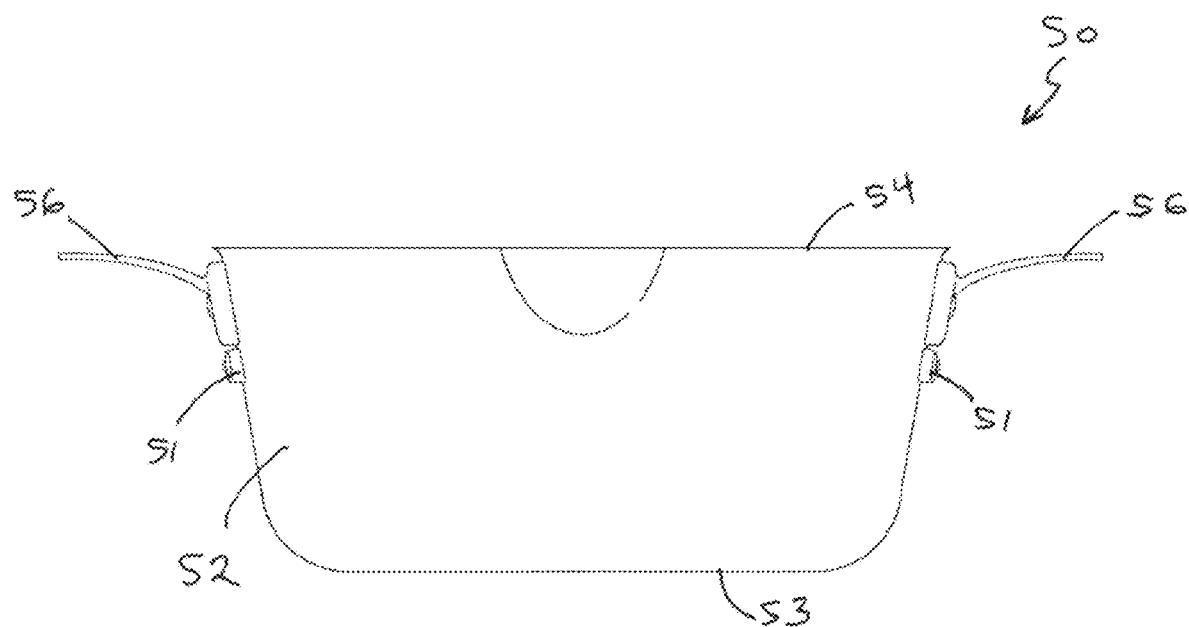
FIG. 32 is a front view of a third pot configured to be stacked and nested in a stable configuration according to a non-limiting embodiment of the subject technology.
Figure 33:
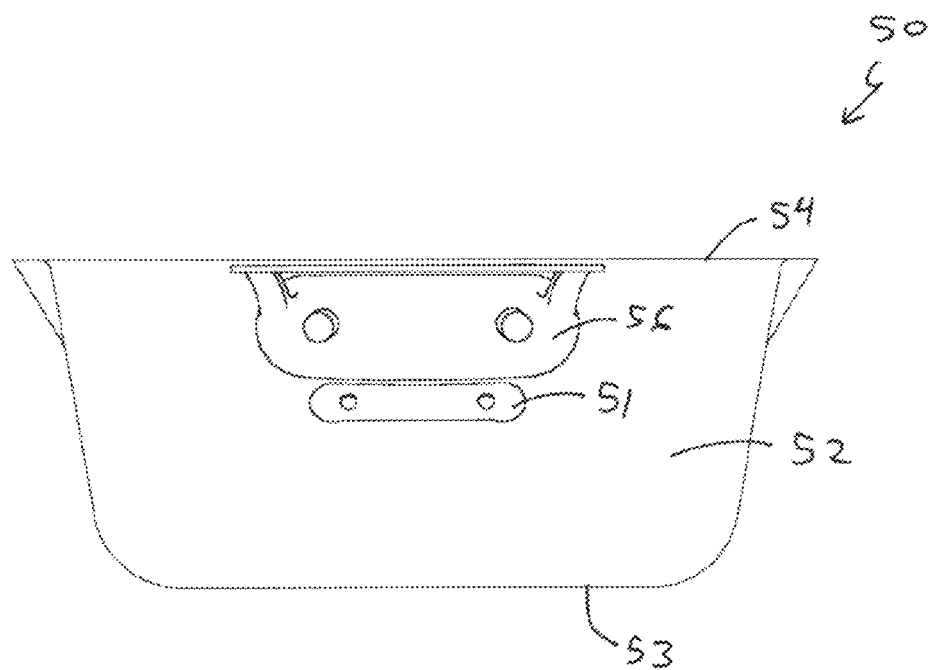
FIG. 33 is a right-side view of a third pot configured to be stacked and nested in a stable configuration according to a non-limiting embodiment of the subject technology.
Figure 34:
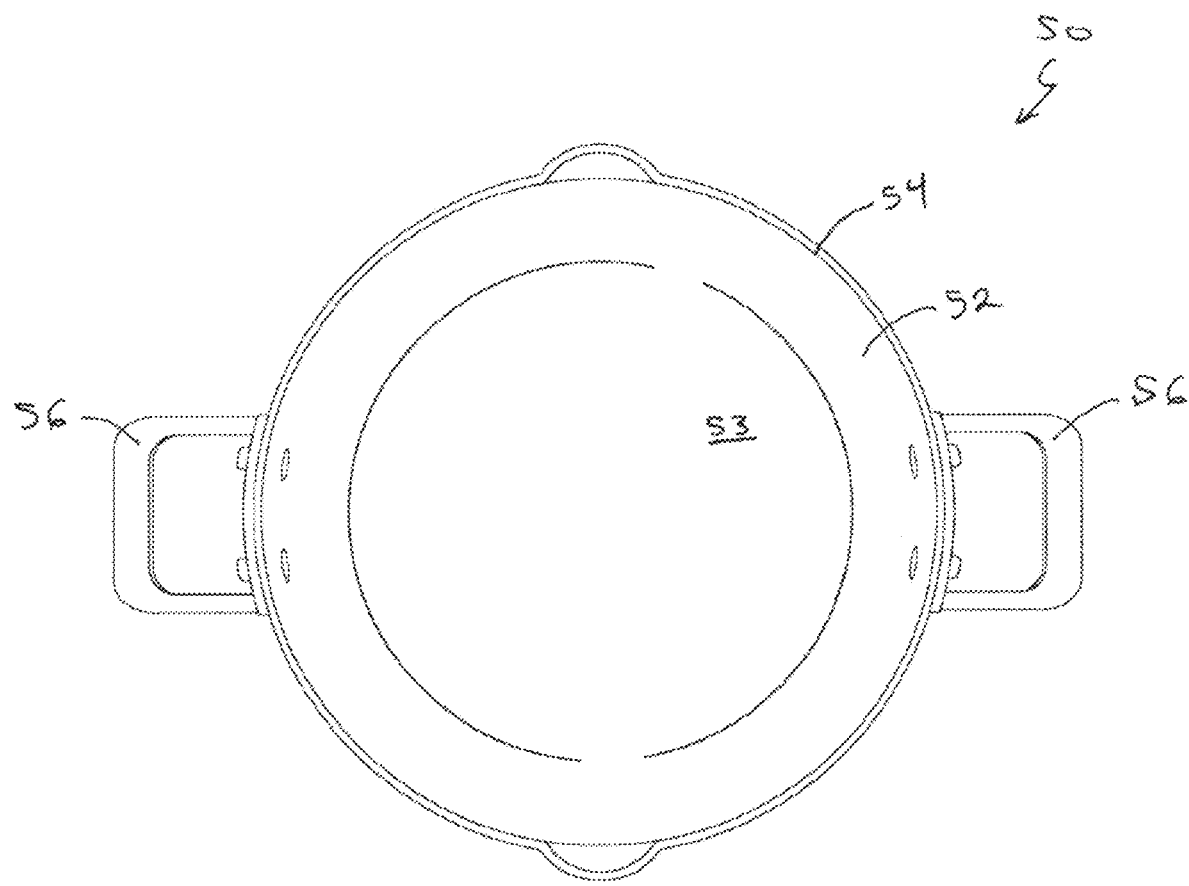
FIG. 34 is a plan view of a third pot configured to be stacked and nested in a stable configuration according to a non-limiting embodiment of the subject technology.
Figure 35:
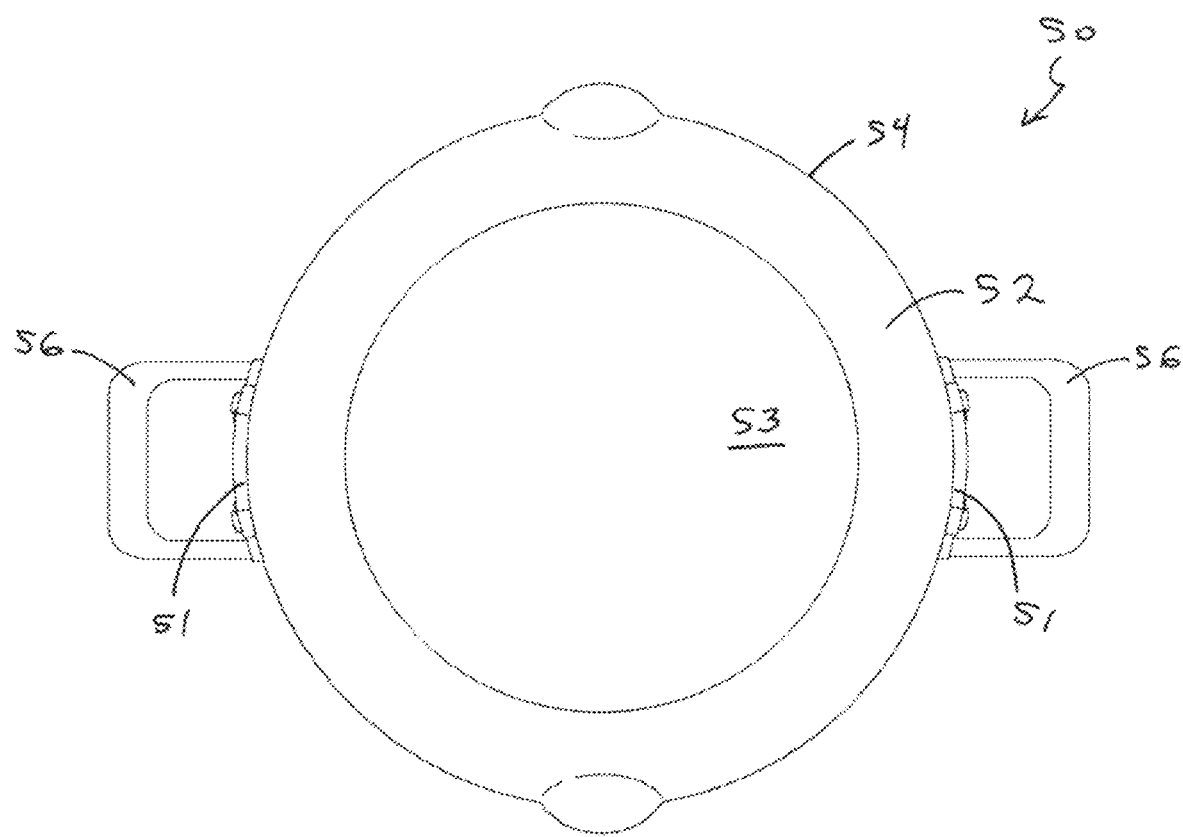
FIG. 35 is a bottom view of a third pot configured to be stacked and nested in a stable configuration according to a non-limiting embodiment of the subject technology.

Generally, a stop for a stackable and nestable cookware item according to the subject technology may be in the form of a rectangular bar or badge, curved to fit the outer surface of the cookware item, having an inner surface which is entirely in contact with the wall to which it is attached, and having projections or nibs adapted to contact the rim of a lower cookware item at a finite number of points, for example, at one, two, three, or more points. For example, as shown in FIG. 19, stop 51 has a lower edge having a non-linear profile which defines exactly two nibs, 102, 103. Stop 51 has left end 100 and a right end 101 spaced apart from left end 100. Nibs 102, 103 disposed and spaced apart on the left end 100 and the right end 101 respectively. As seen for example in FIG. 3, stop 15 has nibs 20 formed at a right end and left end thereof. Stop 15 directly contacts rim 17 at two points, where nibs 20 directly contact rim 17. Between the points of direct contact, a gap (unnumbered) where there is no contact between stop 15 and rim 17 is defined between stop 15 and rim 17 at the top and bottom of the gap, and nibs 102, 103 at the left end and right end of the gap.

Figure 38:
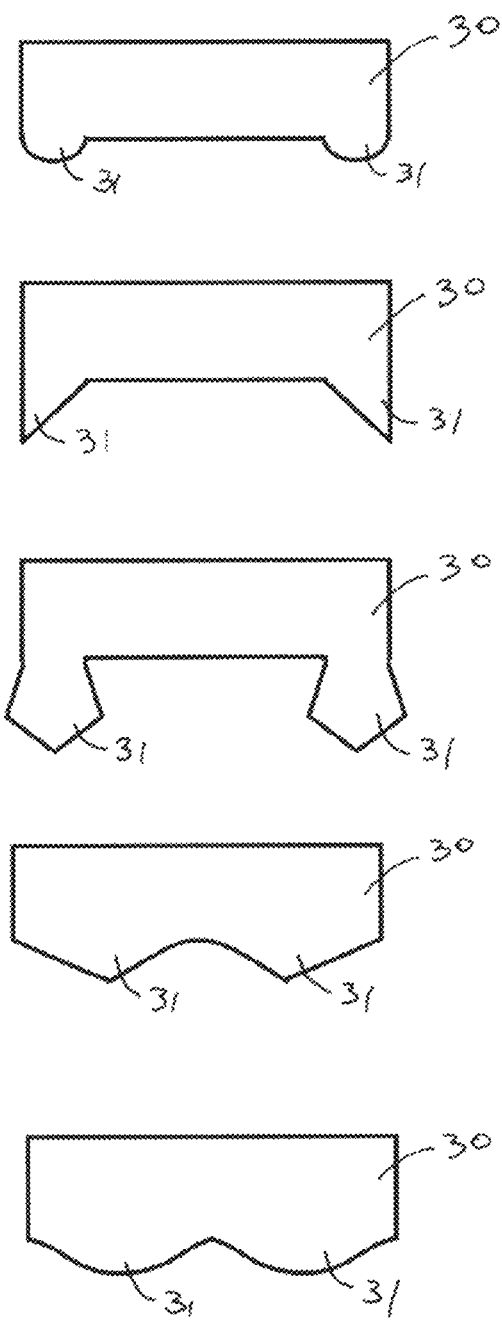
FIG. 38 is a view of the configuration of several different stops for a cookware item according to a non-limiting embodiment of the subject technology.
Figure 39:
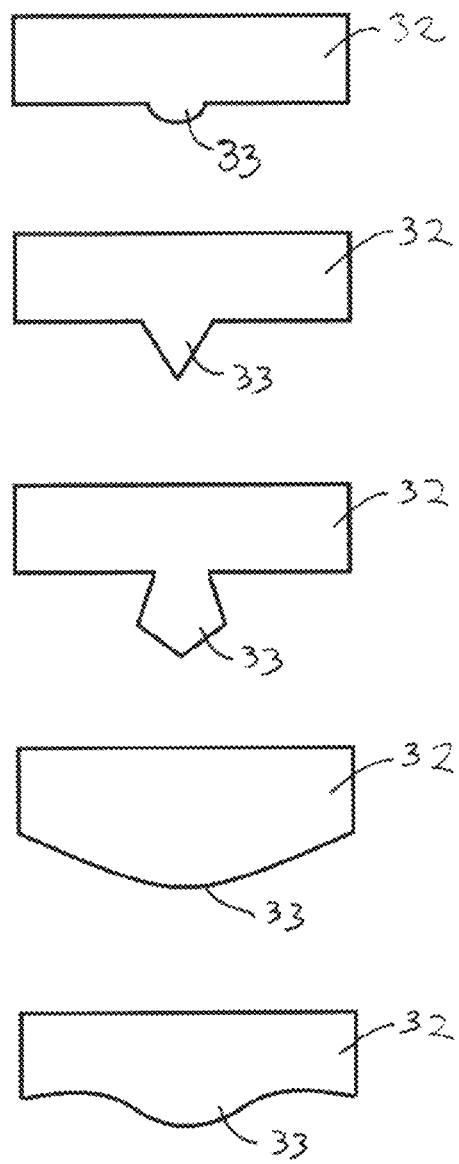
FIG. 39 is a view of the configuration of several different stops for a cookware item according to a non-limiting embodiment of the subject technology.

As shown in the non-limiting embodiments of FIGS. 38 and 39, exemplary shapes for the projections or nibs of a stop include a triangular or other polygonal shape which contacts the lower rim at a vertex of the polygon; or a part of a circle, oval, curve or other rounded shape having a radius which contacts the lower rim at a tangent point of the projection. FIG. 38 shows examples of stops 30 having two projections 31 for contacting the lower item at two contact points, while the exemplary stops 32 of FIG. 38 have one projection 33 for contacting the lower item at one contact point. It will be understood that (unless a claim herein specifies otherwise) a stop may be of any shape that does not interfere with the stacking and nesting of the items, and can be stably attached to the cookware items, and contacts the lower rim at a finite number of points. Preferably the area of the stop-to-rim contact points according to the present invention is minimized, i.e. it is not an extended area along the entire bottom surface of an attachment to the wall of an item. In the case of a stop having two contact points, the distance between the contact points may be 45 mm, or approximately 45 mm, or 46 mm, or approximately 46 mm, or 47 mm, or approximately 47 mm or in the range of 40 mm to 50 mm. It will be understood that it is within the scope of subject technology that a stop may be shaped to contact the lower rim at more than exactly two points, but in an embodiment having multiple stops suitably placed on the cookware item, this is not necessary to achieve the desired stability.

To result in a stable stack of cookware items according to the subject technology, it is desirable for the following conditions to be achieved: (1) the stops of a nested cookware item contact the lower item's rim at a finite number of points; (2) the contact points lie in the same plane; (3) the contact points are sufficiently distributed about the perimeter of the rim to support the nested cookware item without a significant tendency to pivot, rock, or shift about the contact points; (4) the nested item and lower item are not contacting at any other points, i.e. the walls, rim, bases, and any attached handles of the items are not contacting.

Figure 36:
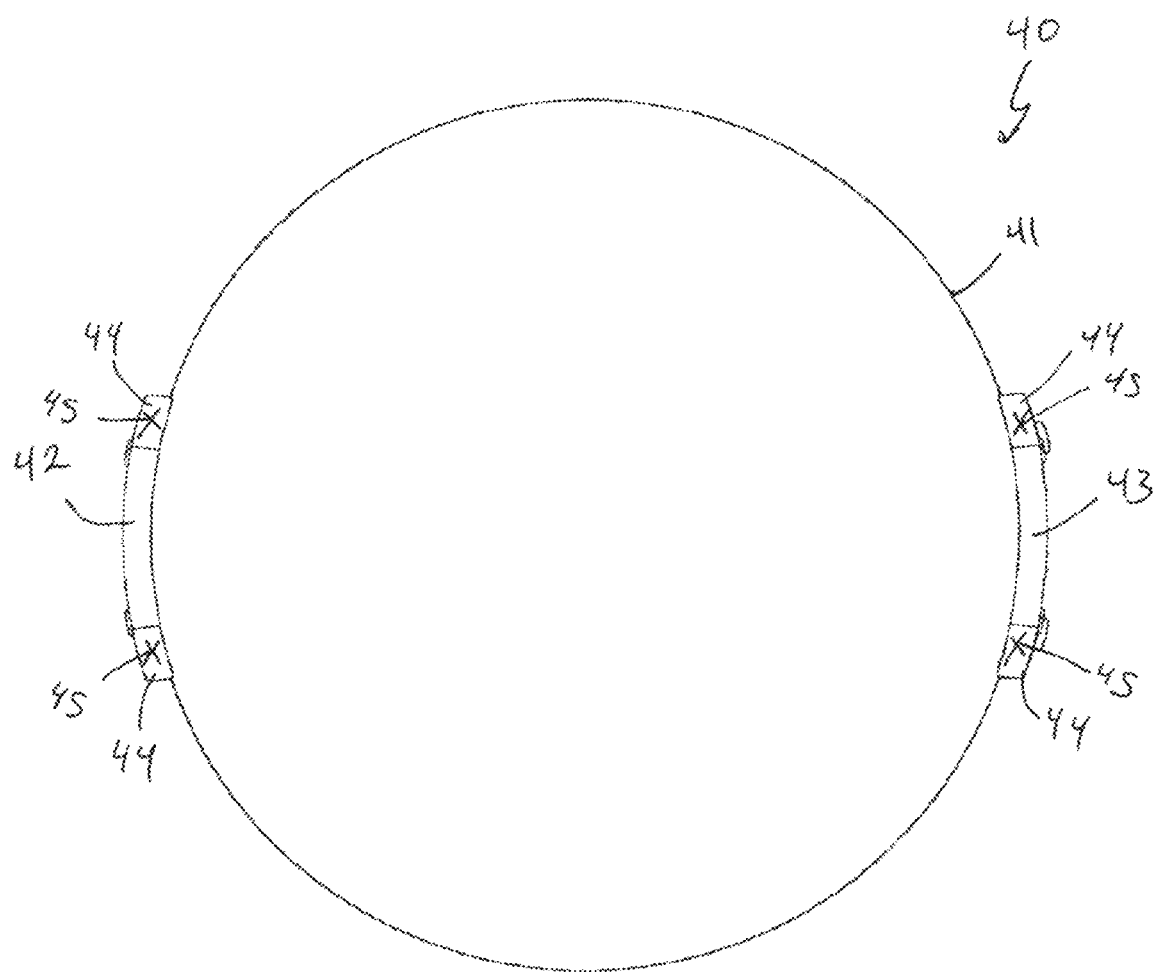
FIG. 36 is a schematic view of stops attached to the wall of a cookware item according to a non-limiting embodiment of the subject technology.
Figure 37:
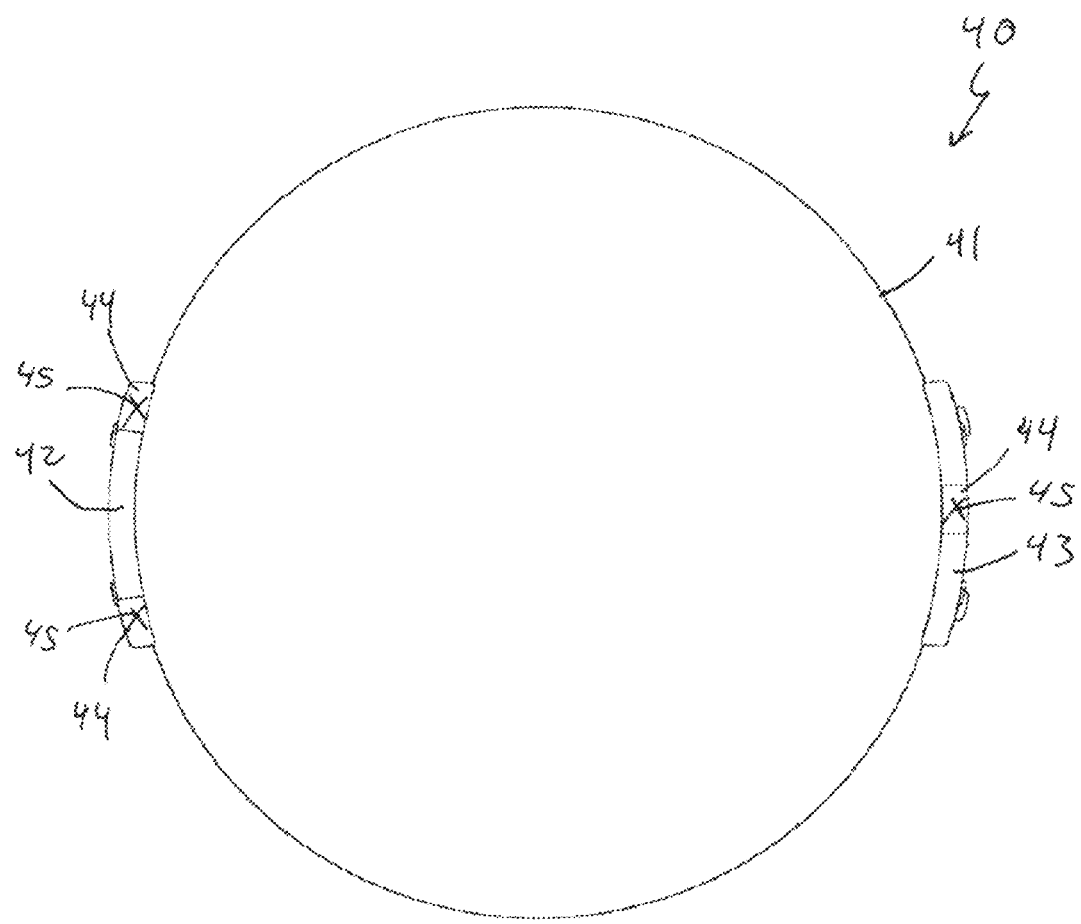
FIG. 37 is a schematic view of stops attached to the wall of a cookware item according to a non-limiting embodiment of the subject technology.

FIGS. 36 and 37 show schematic representations of a cookware item 40 having a wall 41. First stop 42 and second stop 43 are attached to the wall 41, across a diameter of the wall 41. In the example of FIG. 36, first and second stops 42, 43 have two projections 44 each, which together define four contact points 45. In the example of FIG. 37, first stop 42 has two projections 44 and second stop 43 has one projection 44, which together define three contact points 45. Three points of stop-to-rim contact as in FIG. 37 will, by definition, always lie in the same plane. In an embodiment in which four points of contact are utilized as in FIG. 36, care must be taken in the selection of stops and their placement on the nested items that the points of stop-to-rim contact will lie substantially in the same plane. Preferably, the plane of the stop-to-rim contacts is parallel to the plane of the item's base and also to the plane of the item's rim, so the item is supported on the rim by the stops in a straightly upstanding position, which will minimize the chance of contact between the walls, rim, bases, and any attached handles of the items. In this manner the cookware items are stacked in a stable configuration as disclosed herein without interlocking of handles, stops, rims, or other elements of items in the stack.

Figure 40:
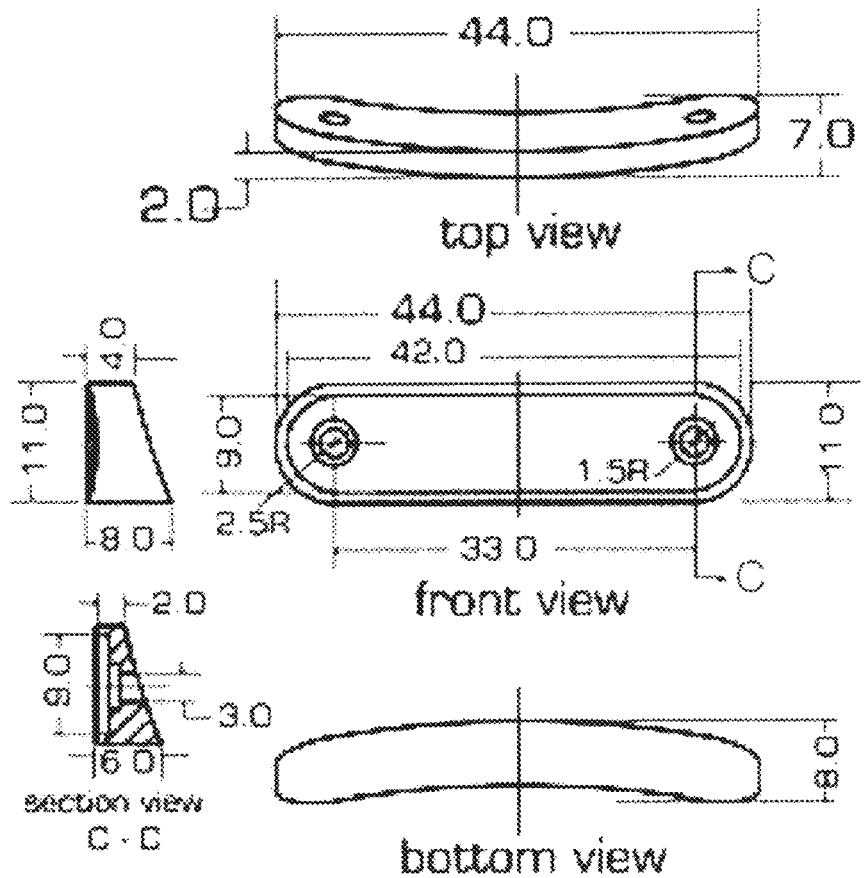
FIG. 40 is a set of dimensioned views of the body of a stop according to a non-limiting embodiment of the subject technology. Dimensions are in mm.
Figure 41:
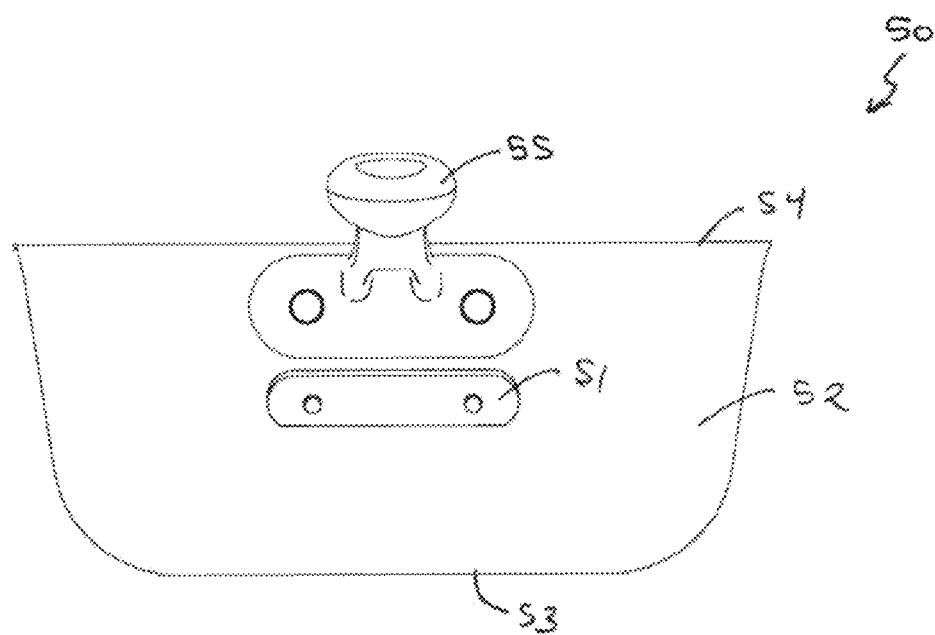
FIG. 41 is a rear view of a fourth pot configured to be stacked and nested in a stable configuration according to a non-limiting embodiment of the subject technology.
Figure 42:
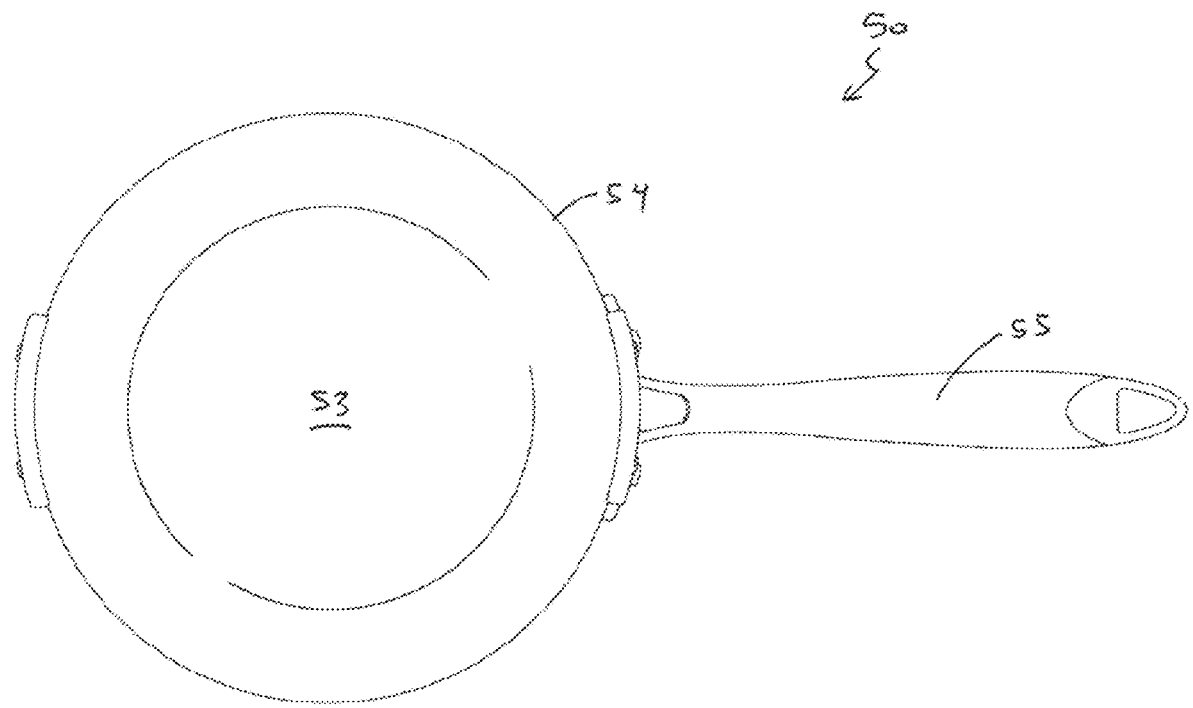
FIG. 42 is a bottom view of a fourth pot configured to be stacked and nested in a stable configuration according to a non-limiting embodiment of the subject technology.
Figure 43:
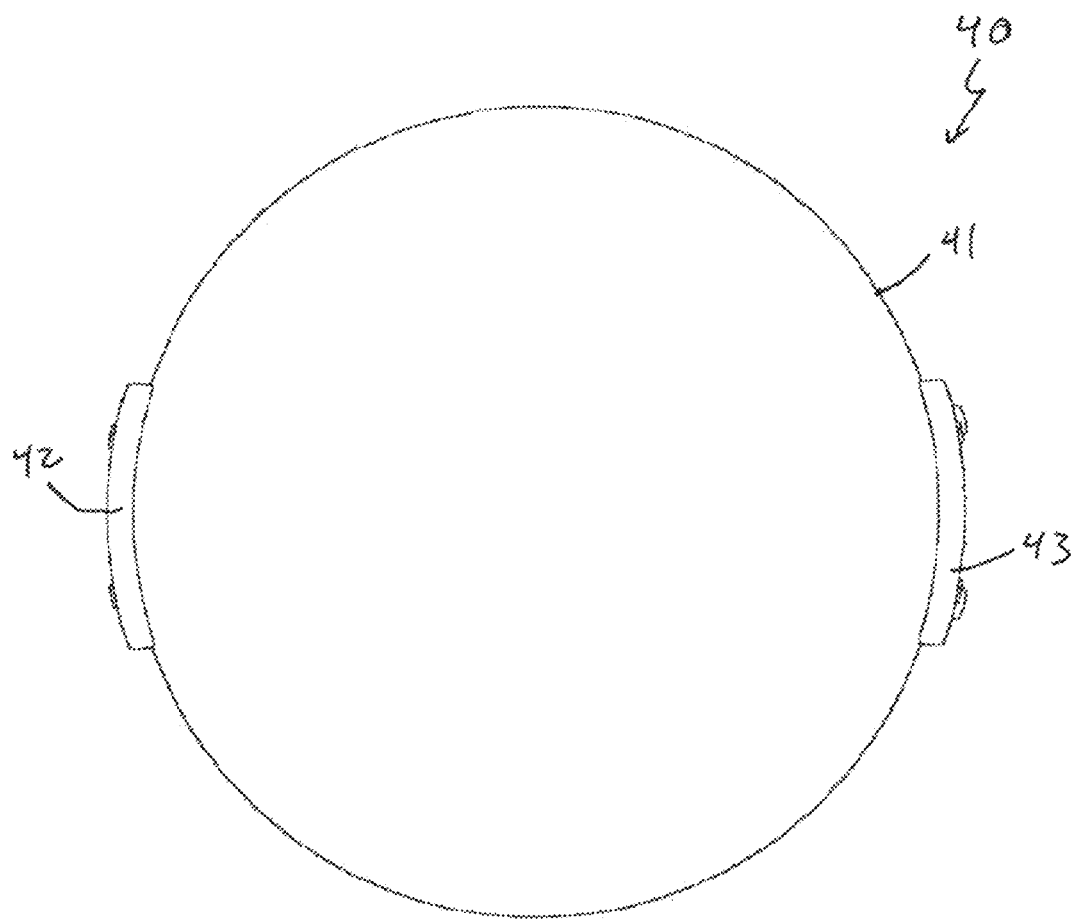
FIG. 43 is a schematic view of stops attached to the wall of a cookware item according to a non-limiting embodiment of the subject technology.

FIGS. 41 and 42 show a cookware item 50 configured to be stackable and nestable, according to a further non-limiting embodiment of the subject technology. In this embodiment, stops 51 are substantially flat on the bottom, i.e. substantially without nibs or projections on the bottom surface. In this embodiment, when item 40 is stacked on another cookware item, stops 51 contact the rim of the lower cookware item along an extent of its length. FIG. 43 shows a schematic representation of a cookware item 40 of this non-limiting embodiment. Stops 42 and 43 in this embodiment are attached to the wall 41, across a diameter of the wall 41, but do not define discrete points of contact with the cookware item into which it is nested and stacked. The flat-bottomed stop 42, 43, 51 of this non-limiting embodiment may be sized, shaped and configured as in FIG. 40, for example. In this non-limiting embodiment, handle 55 is attached to wall 52 of item 50, between rim 54 and stop 51. In this non-limiting embodiment, handle 55 is a separate part from stop 51, (i.e., they are not formed integrally). However, in other embodiments, a flat-bottomed stop is made integrally with a handle.

According to the subject technology a handle may be attached to the wall and/or rim of a nested item. The handle may be positioned above a stop. Alternatively, a stop and a handle may be combined into a single part having both functions. However, it should be understood that a stop according to the subject technology need not be functional as a handle, for example, it may be relatively thin and not extend far enough from the wall of the cookware item to be of any practical use as a handle. It need only extend far enough from the wall to enable contact of its downward projection or projections with the rim of the lower item in the stack. In this aspect of the subject technology, the stop has a thickness such that it does not extend beyond the outer diameter of the lower cookware item, measured at the rim of the lower cookware item; or extends beyond it by less than 1 cm; or extends beyond it by less than 0.5 cm; or extends beyond it by less than 0.25 cm; or extends beyond it by less than 0.1 cm.

Non-limiting embodiments of cookware items are shown, for example, in FIGS. 44-54. As shown, for example, in FIGS. 44-54, a stackable cookware set may comprise items having two stops, disposed on opposite sides of an item. The set may include items having an integrated stop-handle on one side and a stop without an integrated handle on the opposite side. Other items in the same set may have integrated stop-handles on both sides. The integrated handles, where present, may be U-shaped loop handles that extend from a first end of a stop to a second end of a stop, or stick handles that extend from the center of a stop. The integrated handles, where present, may extend from the top of the stop, on the opposite side of the nibs or projections of the stop (where present).

According to a further non-limiting embodiment of the subject technology, not shown in the Figures, a cookware item is provided with three stops attached to its outer surface, each of the three stops being configured to contact the rim of the lower item at exactly one point (e.g., having any of the shapes shown in FIG. 39, for example). Preferably, the three stops are evenly spaced around sides of the cookware item. A handle or handles may be attached above one or more of the stops.

It will also be understood that the ornamental appearance of stackable cookware as shown and described is within the scope of the subject technology.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. A cookware set of stackable and nestable cookware items comprising:
   a first cookware item comprising a first base, a first wall rising from the first base, a first rim at the top of the first wall, a first stop connected to an exterior of the first wall between the first base and the first rim and extending outwardly from the first wall, and a second stop connected to an exterior of the first wall between the first base and the first rim and extending outwardly from the first wall and having an integrated handle extending outwardly from the second stop;
   a second cookware item comprising a second base, a second wall rising from the second base, and a second rim at the top of the second wall;
   the first cookware item sized and configured to stack on and nest within the second cookware item when placed on the second cookware item with the first stop and second stop contacting the second rim and supporting the first cookware item in a stacked and nested position on the second cookware item, provided that the first base and first wall are not contacting the second base or second wall;
   wherein the second stop has a lower edge having a non-linear profile which defines exactly two contact points, and wherein the second stop has a left end and a right end spaced apart from the left end, the exactly two contact points of the second stop disposed and spaced apart on the left end and the right end; and
   wherein the first stop and the second stop each have a thickness such that the first stop and the second stop do not extend beyond the second rim.

2. The cookware set of claim 1, wherein the first stop has a lower edge having a non-linear profile which defines exactly one or exactly two contact points.

3. The cookware set of claim 1, wherein the first stop has a flat lower edge which is adapted to contact the second rim along an extent of a length of the flat lower edge.

4. The cookware set of claim 1, wherein the integrated handle of the second stop extends from an upper edge of the second stop.

5. The cookware set of claim 2, wherein the integrated handle of the second stop extends from an upper edge of the second stop.

6. The cookware set of claim 1 wherein the first stop and second stop are on opposite sides of the first cookware item.

7. The cookware set of claim 1 wherein the first stop or the second stop has a height in the direction from the first base to the first rim, and a width greater than the height.

8. The cookware set of claim 2 wherein all of the contact points lie in the same plane.

9. The cookware set of claim 1 wherein the integrated handle of the second stop is a U-shaped loop handle extending from a first end of the second stop to a second end of the second stop.

10. The cookware set of claim 1 wherein the integrated handle of the second stop is a stick handle extending from the second stop.

11. The cookware set of claim 1 wherein the second cookware item comprises a third stop connected to an exterior of the second wall between the second base and the second rim and extending outwardly from the second wall, and a fourth stop connected to an exterior of the second wall between the second base and the second rim and extending outwardly from the second wall and having an integrated handle extending outwardly from the fourth stop.

* * * * *